US011384772B2

(12) United States Patent
Garrard et al.

(10) Patent No.: US 11,384,772 B2
(45) Date of Patent: Jul. 12, 2022

(54) ROTATING MACHINE AND MATING RING INCLUDED THEREIN

(71) Applicant: BorgWarner Inc., Auburn Hills, MI (US)

(72) Inventors: Tyler Ransom Garrard, Arden, NC (US); Erwin Perry Ellwood, III, Candler, NC (US); Frederick Michael Huscher, Hendersonville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 129 days.

(21) Appl. No.: 16/788,809

(22) Filed: Feb. 12, 2020

(65) Prior Publication Data
US 2020/0182254 A1 Jun. 11, 2020

Related U.S. Application Data

(63) Continuation-in-part of application No. 16/136,491, filed on Sep. 19, 2018, now Pat. No. 11,078,807.

(51) Int. Cl.
*F04D 29/12* (2006.01)
*F04D 25/06* (2006.01)
(Continued)

(52) U.S. Cl.
CPC ....... *F04D 29/122* (2013.01); *F04D 25/0606* (2013.01); *H01M 8/04014* (2013.01);
(Continued)

(58) Field of Classification Search
CPC .... F01D 25/246; F01D 11/003; F01D 25/183; F02C 6/12; F02C 7/28; F05B 2240/57;
(Continued)

(56) References Cited

U.S. PATENT DOCUMENTS 4,420,160 A 12/1983 Laham
4,523,764 A 6/1985 Albers et al.
(Continued)

FOREIGN PATENT DOCUMENTS

CN 109654040 A 4/2019
DE 102006015571 A1 10/2007
(Continued)

OTHER PUBLICATIONS

English language abstract for EP 1 054 196 extracted from espacenet.com database on Oct. 15, 2020, 1 page.
(Continued)

*Primary Examiner* — Eric J Zamora Alvarez
(74) *Attorney, Agent, or Firm* — Howard & Howard Attorneys PLLC

(57) ABSTRACT

A rotating machine includes a shaft, a first impeller wheel, and a second impeller wheel. The rotating machine also includes a first seal assembly including a first carbon ring disposed about the shaft, with the first carbon ring having a first carbon surface. The first seal assembly also includes a first mating ring disposed about the shaft, with the first mating ring having a first mating surface facing and configured to contact the first carbon surface. The rotating machine additionally includes a second seal assembly including a second carbon ring disposed about the shaft, with the second carbon ring having a second carbon surface. The second seal assembly also includes a second mating ring disposed about the shaft, with the second mating ring having a second mating ring surface facing and configured to contact the second carbon surface.

27 Claims, 11 Drawing Sheets

(51) Int. Cl.
*F04D 29/10* (2006.01)
*F16J 15/30* (2006.01)
*F04D 29/02* (2006.01)
*H01M 8/04014* (2016.01)

(52) U.S. Cl.
CPC ........ *F04D 29/102* (2013.01); *F05B 2240/57* (2013.01); *F05B 2280/2006* (2013.01); *F16J 15/30* (2013.01)

(58) Field of Classification Search
CPC ......... F05B 2280/2006; F05D 2220/40; F05D 2230/642; F05D 2240/55; F16J 15/3412; F16J 15/30; F04D 25/04; F04D 29/063; F04D 29/122; F04D 25/0606; F04D 29/102; F04D 29/12
See application file for complete search history.

(56) References Cited

U.S. PATENT DOCUMENTS

| | | | |
|---|---|---|---|
| 5,071,141 A | 12/1991 | Lai et al. | |
| 5,441,283 A | 8/1995 | Pecht et al. | |
| 5,722,665 A | 3/1998 | Sedy et al. | |
| 5,890,881 A * | 4/1999 | Adeff | F16J 15/441 417/407 |
| 6,142,478 A | 11/2000 | Pecht et al. | |
| 6,325,380 B1 | 12/2001 | Feigl et al. | |
| 7,265,080 B2 | 9/2007 | Iso et al. | |
| 7,997,802 B2 * | 8/2011 | Simon | F01D 3/04 384/130 |
| 8,162,322 B2 | 4/2012 | Flaherty | |
| 8,540,249 B2 | 9/2013 | Prellwitz | |
| 8,641,366 B1 | 2/2014 | Ullah et al. | |
| 9,574,459 B2 | 2/2017 | Ullah et al. | |
| 9,574,666 B2 | 2/2017 | Ferris et al. | |
| 9,909,438 B2 | 3/2018 | Duffy et al. | |
| 9,951,784 B2 | 4/2018 | Agrawal et al. | |
| 2002/0070505 A1 | 6/2002 | Auber | |
| 2003/0037546 A1 * | 2/2003 | Kapich | F01D 15/08 60/608 |
| 2014/0086741 A1 | 3/2014 | Ullah | |
| 2014/0117625 A1 | 5/2014 | Short et al. | |
| 2014/0370412 A1 | 12/2014 | Sumser et al. | |
| 2015/0023785 A1 * | 1/2015 | Stanko | F01D 21/045 415/124.2 |
| 2015/0125263 A1 | 5/2015 | Grabowska | |
| 2015/0125306 A1 * | 5/2015 | Schmid | F01D 5/025 416/198 A |
| 2017/0096905 A1 | 4/2017 | Lebigre | |
| 2018/0163617 A1 | 6/2018 | Merritt et al. | |
| 2018/0163739 A1 | 6/2018 | Tabacchi et al. | |
| 2019/0085768 A1 | 3/2019 | Ikeya | |

FOREIGN PATENT DOCUMENTS

| | | |
|---|---|---|
| DE | 102009004035 A1 | 7/2010 |
| DE | 102016015266 A1 | 6/2018 |
| EP | 1054196 A2 | 11/2000 |
| JP | 2002369474 A | 12/2002 |
| JP | 2004245381 A | 9/2004 |
| JP | 2004301225 A | 10/2004 |
| JP | 2014114879 A | 6/2014 |
| JP | 2017002750 A | 1/2017 |
| WO | 2013006560 A1 | 1/2013 |
| WO | 2013106303 A1 | 7/2013 |
| WO | 2014046931 A1 | 3/2014 |
| WO | 2014209852 A1 | 12/2014 |
| WO | 2017146977 A1 | 8/2017 |

OTHER PUBLICATIONS

English language abstract for DE 10 2009 004 035 extracted from espacenet.com database on Oct. 10, 2018, 2 pages.
English language abstract and machine-assisted English translation for CN 109654040 extracted from espacenet.com database on Mar. 12, 2020, 6 pages.
English language abstract and machine-assisted English translation for DE 10 2006 015 571 extracted from espacenet.com database on Mar. 12, 2020, 6 pages.
Machine-assisted English language abstract and machine-assisted English translation for DE 10 2016 015 266 extracted from espacenet.com database on Mar. 12, 2020, 11 pages.
English language abstract and machine-assisted English translation for JP 2002-369474 extracted from espacenet.com database on Mar. 12, 2020, 13 pages.
English language abstract and machine-assisted English translation for JP 2004-245381 extracted from espacenet.com database on Mar. 12, 2020, 9 pages.
English language abstract and machine-assisted English translation for JP 2004-301225 extracted from espacenet.com database on Mar. 12, 2020, 6 pages.
English language abstract and machine-assisted English translation for JP 2014-114879 extracted from espacenet.com database on Mar. 12, 2020, 9 pages.
English language abstract and machine-assisted English translation for JP 2017-002750 extracted from espacenet.com database on Mar. 12, 2020, 22 pages.
Garrett Motion, "Two Stage Electric Compressor for Fuel Cells Website", https://www.garrettmotion.com/electric-hybrid/twostage-electric-compressor-for-fuel-cells/, 2019, 7 pages.

* cited by examiner

ROTATING MACHINE AND MATING RING INCLUDED THEREIN

CROSS-REFERENCE TO RELATED APPLICATIONS

The subject application is a continuation-in-part application of U.S. application Ser. No. 16/135,491 filed on Sep. 19, 2018, which is herein incorporated by reference in its entirety.

BACKGROUND OF THE INVENTION

1. Field of the Invention

The present invention relates generally to a rotating machine and, more specifically, to a mating ring for use in the rotating machine.

2. Description of the Related Art

Rotating machines, such as turbochargers, electric compressors, and the like, are used in various applications, such as vehicles, heavy equipment, diesel engines, motors, cooling systems, fuel cell assemblies, and the like. Typical rotating machines include a shaft extending along an axis between a first end and a second end, a first impeller wheel coupled to the first end of the shaft, and a second impeller wheel coupled to the second end of the shaft. Typical rotating machines also include one or more bearings for rotatably supporting the shaft. Typical rotating machines also include a first seal assembly adjacent the first impeller wheel, and a second seal assembly adjacent the second impeller wheel. Both the first and second seal assemblies inhibit the flow of lubricant from the one or more bearings in the bearing housing. The first and second seal assemblies typically include a piston ring seal.

However, typical sealing assemblies for rotating machines including piston ring seals are often subject to undesired leakage of lubricant and other contaminants through the first seal assembly and the second seal assembly. As such, there remains a need to provide for a rotating machine with an improved first and second seal assembly.

Additionally, typical rotating machines may be used in a fuel cell air supply system, which provides airflow to a fuel cell to increase power density of the fuel cell during operation. When a rotating machine is used in a fuel cell air supply system, it is known that fuel cells are extremely sensitive to hydrocarbon poisoning, such as from a lubricant. In view of this, many rotating machines used in fuel cell air supply systems have moved from using lubricant-fed bearings and piston ring seals, which results in hydrocarbon poisoning in the fuel cell, to using rotating machines with air foil bearings or other lubricant free bearings, which are free of any hydrocarbons. However, such air foil bearings and other lubricant free bearings have limited operating ranges, are expensive, result in the rotating machine being less efficient, and have a short life, which requires replacement of such air foil bearings and reduces the longevity of the rotating machine. As such, there remains a need to provide for an improved rotating machine for use in a fuel cell air supply system.

SUMMARY OF THE INVENTION AND ADVANTAGES

In one embodiment, a rotating machine includes a shaft extending along an axis between a first end and a second end spaced from the first end along the axis, a first impeller wheel coupled to the first end of the shaft, and a second impeller wheel coupled to the second end of the shaft. The rotating machine also includes a first seal assembly including a first carbon ring disposed about the shaft and spaced from the first impeller wheel along the axis, with the first carbon ring having a first carbon surface, and a first mating ring disposed about the shaft and spaced from the first impeller wheel along the axis such that the first carbon ring is disposed between the first impeller wheel and the first mating ring, with the first mating ring having a first mating surface facing and configured to contact the first carbon surface. The rotating machine additionally includes a second seal assembly including a second carbon ring disposed about the shaft and spaced from the second impeller wheel along the axis, with the second carbon ring having a second carbon surface. The second seal assembly also includes a second mating ring disposed about the shaft and spaced from the second impeller wheel along the axis such that the second carbon ring is disposed between the second impeller wheel and the second mating ring, with the second mating ring having a second mating ring surface facing and configured to contact the second carbon surface.

Accordingly, the first seal assembly having the first mating ring and first carbon ring, and the second seal assembly having the second mating ring and the second carbon ring reduces leakage of contaminants to the first and second impeller wheels, respectively, which overall increases longevity of the rotating machine.

In another embodiment, a rotating machine includes a bearing housing defining a bearing housing interior, a shaft extending along an axis between a first end and a second end spaced from the first end along the axis, with the shaft disposed in the bearing housing interior. The rotating machine also includes an impeller housing coupled to the bearing housing, with the impeller housing defining an impeller housing interior, and an impeller wheel coupled to the shaft at the first end and disposed in the impeller housing interior. The rotating machine additionally includes a seal assembly disposed in the bearing housing interior. The seal assembly includes a carbon ring disposed about the shaft and spaced from the impeller wheel along the axis, with the carbon ring having a carbon surface, and a mating ring disposed about the shaft and spaced from the impeller wheel along the axis such that the carbon ring is disposed between the impeller wheel and the mating ring, with the mating ring having a mating surface facing and configured to contact the carbon surface. The rotating machine further includes a lubricant-fed bearing disposed in the bearing housing interior and rotatably supporting the shaft at the first end, with the seal assembly disposed between the lubricant-fed bearing and the impeller wheel with respect to the axis. The rotating machine also includes an electric machine including a rotor rotatably coupled to the shaft, and a stator disposed about the rotor. The impeller housing interior is adapted to be fluidly coupled to a contaminant free environment, with the carbon ring and the mating ring preventing lubricant from entering the contaminant free environment.

Accordingly, the mating ring and the carbon ring prevent lubricant from the lubricant-fed bearing and other contaminants from entering the impeller housing interior and, therefore, from entering the contaminant free environment, which overall increases longevity of the rotating machine, and increases performance of the rotating machine as a result of the lubricant-fed bearing being utilized.

In another embodiment, a system includes a rotating machine including a bearing housing defining a bearing housing interior, and a shaft extending along an axis between a first end and a second end spaced from the first end along the axis, with the shaft disposed in the bearing housing interior. The rotating machine also includes a compressor housing coupled to the bearing housing, with the compressor housing defining a compressor housing interior, a compressor wheel coupled to the shaft at the first end and disposed in the compressor housing interior, and a seal assembly disposed in the bearing housing interior. The seal assembly includes a carbon ring disposed about the shaft and spaced from the compressor wheel along the axis, with the carbon ring having a carbon surface, and a mating ring disposed about the shaft and spaced from the compressor wheel along the axis such that the carbon ring is disposed between the compressor wheel and the mating ring, with the mating ring having a mating surface facing and configured to contact the carbon surface. The rotating machine additionally includes a lubricant-fed bearing disposed in the bearing housing interior and rotatably supporting the shaft at the first end, with the seal assembly disposed between the lubricant-fed bearing and the compressor wheel with respect to the axis, and an electric machine including a rotor rotatably coupled to the shaft, and a stator disposed about the rotor, with the electric machine being configured to transmit torque to the shaft to rotate the compressor wheel. The system also includes a fuel cell assembly including a fuel cell housing defining a fuel cell interior, and a fuel cell disposed in the fuel cell interior. The compressor housing is coupled to the fuel cell housing, and the compressor housing interior is fluidly coupled to the fuel cell interior for delivering compressed air to the fuel cell assembly for cooling the fuel cell.

Accordingly, the mating ring and the carbon ring prevent lubricant from the lubricant-fed bearing and other contaminants from entering the compressor housing interior and, therefore, from entering the fuel cell interior, which overall increases longevity of the rotating machine, and increases performance of the rotating machine as a result of the lubricant-fed bearing being used.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
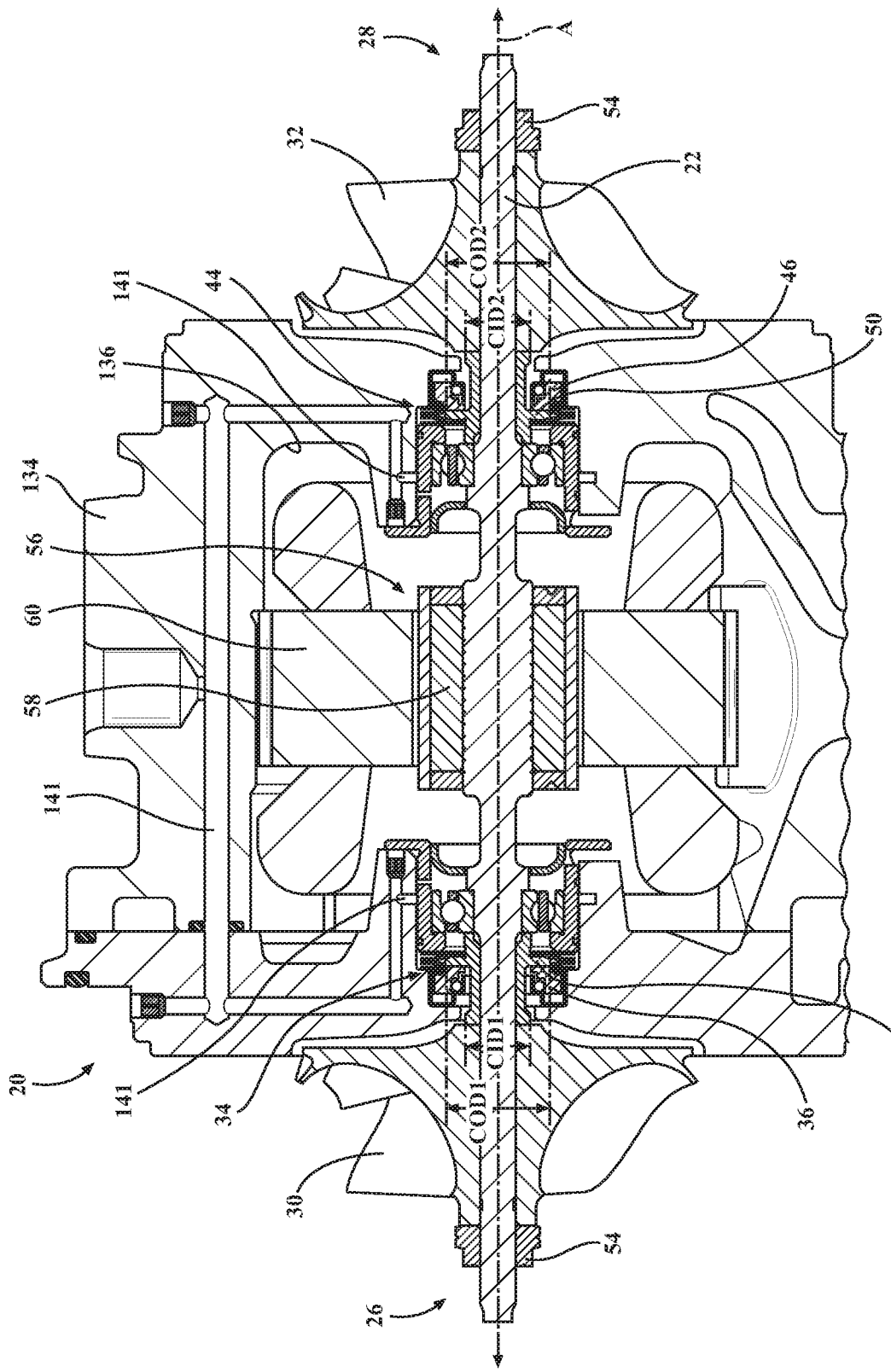
FIG. 1 is a cross-sectional view of a rotating machine, with the rotating machine including a shaft extending along an axis, a first impeller wheel coupled to the shaft, a second impeller wheel coupled to the shaft, a first seal assembly, and a second seal assembly.
Figure 4:
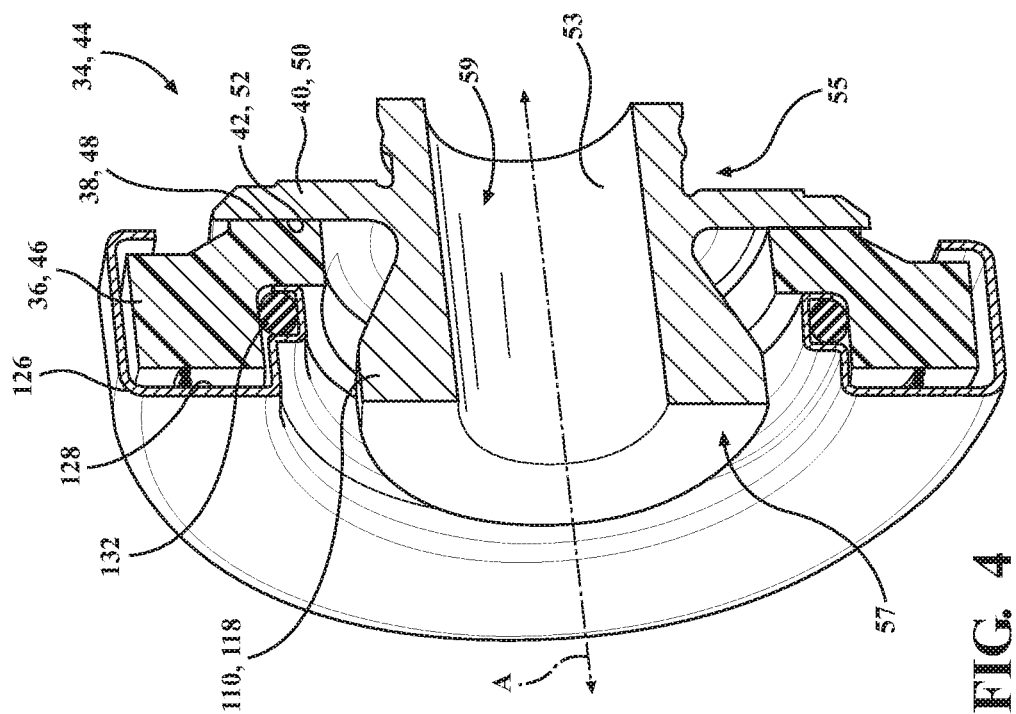
FIG. 4 is a perspective cross-sectional view of a seal assembly representative of the first and second seal assemblies, with the seal assembly including a carbon ring and a mating ring.

With reference to the Figures, wherein like numerals indicate like parts throughout the several views, a rotating machine 20 is shown in FIG. 1. The rotating machine 20 includes a shaft 22 extending along an axis A between a first end 26 and a second end 28 spaced from the first end 26 along the axis A, a first impeller wheel 30 coupled to the first end 26 of the shaft 22, and a second impeller wheel 32 coupled to the second end 28 of the shaft 22. The rotating machine 20 also includes a first seal assembly 34 including a first carbon ring 36 disposed about the shaft 22 and spaced from the first impeller wheel 30 along the axis A. The first carbon ring 36 has a first carbon surface 38, as shown in FIG. 4. The first seal assembly 34 also includes a first mating ring 40 disposed about the shaft 22 and spaced from the first impeller wheel 30 along the axis A such that the first carbon ring 36 is disposed between the first impeller wheel 30 and the first mating ring 40, as shown in FIG. 1. With reference to FIG. 4, the first mating ring 40 has a first mating surface 42 facing and configured to contact the first carbon surface 38.

Figure 3:
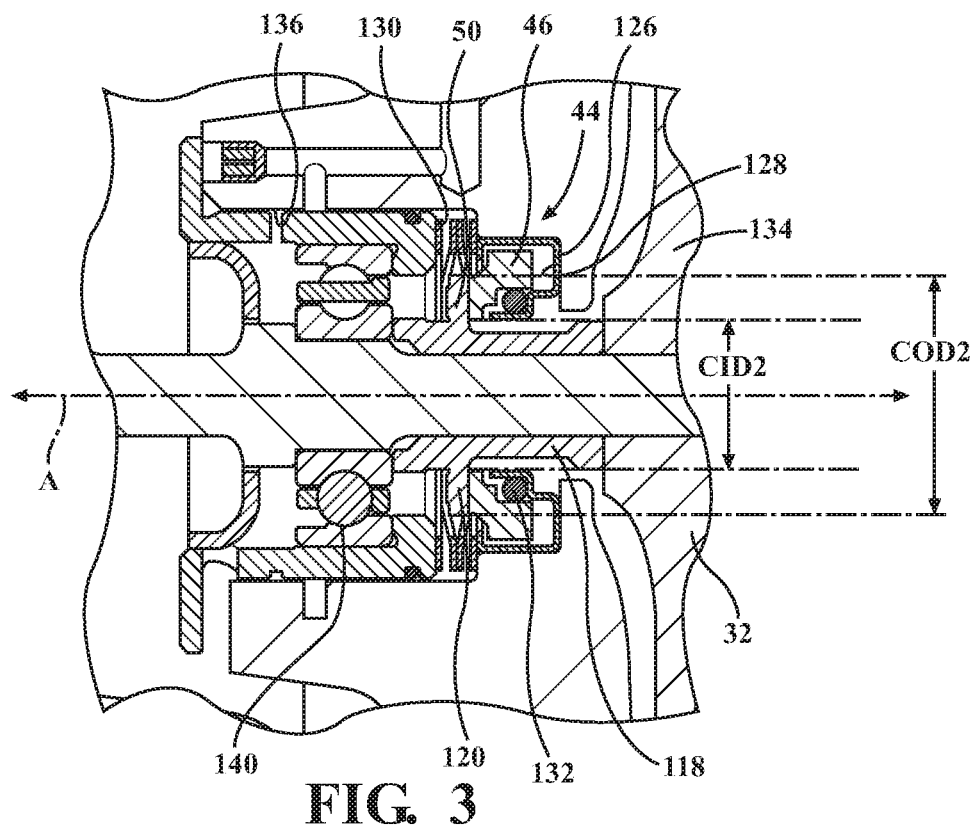
FIG. 3 is a close-up view of the second seal assembly of FIG. 1.
Figure 5:
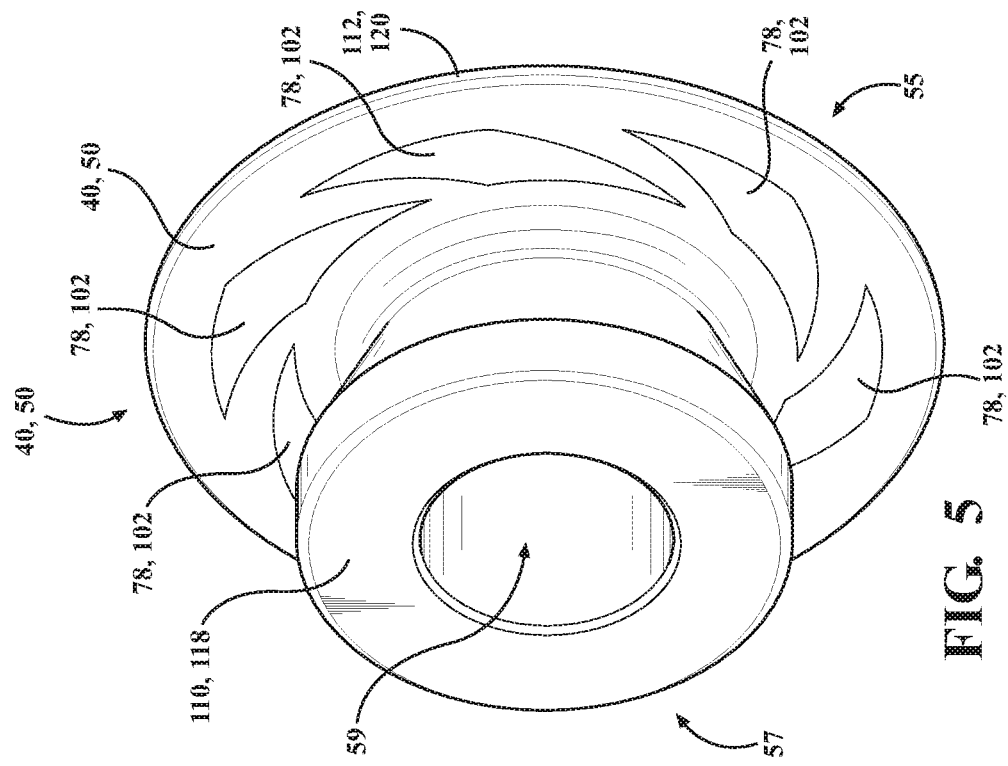
FIG. 5 is a perspective view of the mating ring of the seal assembly defining a plurality of grooved portions.

With reference to FIGS. 1, 3, and 4, the rotating machine 20 additionally includes a second seal assembly 44 including a second carbon ring 46 disposed about the shaft 22 and spaced from the second impeller wheel 32 along the axis A, with the second carbon ring 46 having a second carbon surface 48. The second seal assembly 44 also includes a second mating ring 50 disposed about the shaft 22 and spaced from the second impeller wheel 32 along the axis A such that the second carbon ring 46 is disposed between the second impeller wheel 32 and the second mating ring 50, with the second mating ring 50 having a second mating surface 52 facing and configured to contact the second carbon surface 48. The first and second mating rings 40, 50 may have an interior mating surface 53 extending along the axis A between a first mating end 55 and a second mating end 57 spaced from the first mating end 55, with the interior mating surface 53 defining a bore 59. The first and second seal assemblies 34, 44 are is commonly referred to as a dry-gas seal, a face seal, a lift-off face seal, a non-contacting face seal, a mechanical face seal, a shallow hydropad seal, a groove seal, or a spiral groove seal.

The first seal assembly 34 having the first mating ring 40 and first carbon ring 36, and the second seal assembly 44 having the second mating ring 50 and the second carbon ring 46 reduces leakage of contaminants, such as lubricant and carbon deposits, to the first and second impeller wheels 30, 32, respectively, which overall increases longevity of the rotating machine 20. Additionally, as described in further detail below, in embodiments where a lubricant-fed bearing is used in the rotating machine 20, which may be used as a result of the first seal assembly 34 having the first mating ring 40 and first carbon ring 36, and the second seal assembly 44 having the second mating ring 50 and the second carbon ring 46, performance of the rotating machine 20 increases.

The first mating surface 42 may face the first end 26 of the shaft 22 and the second mating surface 52 may face the second end 28 of the shaft 22 such that the first and second mating surfaces 42, 52 are facing opposite directions with respect to the axis A. Having the first and second mating surfaces 42, 52 facing in opposite directions with respect to the axis A ensures that the first and second impeller wheels 30, 32 are isolated from contaminants, such as lubricant and carbon deposits, due to the first and second seal assemblies 34, 44.

The first and second impeller wheels 30, 32 may be removably coupled to the shaft 22. For example, the first and second impeller wheels 30, 32 may be removably coupled to the shaft 22 through a nut 54. In one embodiment, the first and second impeller wheels 30, 32 are comprised of aluminum or titanium. In such embodiments, the first and second impeller wheels 30, 32 may be referred to as first and second compressor wheels, respectively. In other words, the first and second compressor wheels are configured to deliver compressed air, rather than receive a working fluid, such as exhaust gas. Additionally, in such embodiments, the first and second compressor wheels may be in series (e.g., for higher pressure ratios), or in parallel (e.g., for higher flow rates). When the first and second impeller wheels 30, 32 are further defined as first and second compressor wheels, the rotating machine 20 may be referred to as a two-stage compressor. It is to be appreciated that the first and second impeller wheels 30, 32 may be axial flow or radial flow impeller wheels (including axial and radial flow compressor wheels).

In other embodiments, the first impeller wheel 30 may be further defined as a compressor wheel, and the second impeller wheel 32 may be further defined as a turbine wheel. In other words, when the first impeller wheel 30 is further defined as a compressor wheel, the first impeller wheel 30 is configured to deliver compressed air. When the second impeller wheel 32 is further defined as a turbine wheel, the second impeller wheel is configured to receive a working fluid, such as exhaust gas, to rotate the shaft 22 and, in turn, the first impeller wheel 30 (compressor wheel) to deliver compressed air. The turbine wheel may be integral with (i.e., one piece) the shaft 22. In embodiments where the first impeller wheel 30 is further defined as a compressor wheel, and the second impeller wheel 32 is further defined as a turbine wheel, the turbine wheel may be part of a fixed geometry turbine (flow area of working fluid remains constant) or a variable geometry turbine (flow area of working fluid may be changed). In embodiments where the turbine wheel is part of a variable geometry turbine, the compressor wheel may be part of a single variable inlet compressor. It is to be appreciated that when the second impeller wheel 32 is further defined as a turbine wheel, the turbine wheel may be an axial flow or radial flow turbine wheel.

In other embodiments, the rotating machine 20 may be used in an organic Rankine cycle waste heat recovery system, for example as a turbine expander. In such embodiments, the rotating machine 20 first and second impeller wheels 30, 32 may be further defined as first and second turbine wheels for receiving a working fluid. The first and second impeller wheels 30, 32, when further defined as first and second turbine wheels may be in series with one another or in parallel with one another. It is also to be appreciated that when the rotating machine 20 is used in an organic Rankine cycle waste heat recovery system as a turbine expander that the first impeller wheel 30 may be further defined as a turbine wheel for receiving the working fluid, and that the second impeller wheel 32 may be further defined as a pump impeller for pumping the working fluid in the organic Rankine cycle waste heat recovery system. It is to be appreciated that when the first impeller wheel 30 is further defined as a first turbine wheel that the first turbine wheel may be a variable or fixed geometry turbine wheel, and that when the second impeller wheel 32 is further defined a second turbine wheel that the second turbine wheel may be variable or fixed geometry turbine wheel. When the rotating machine 20 is used in an organic Rankine cycle waste heat recovery system, the first and second impeller wheels 30, 32 may be comprised of any suitable material, for example aluminum, stainless steel, or nickel alloy, such as Inconel®.

The rotating machine 20 may include an electric machine 56. In such embodiments, the electric machine 56 includes a rotor 58 rotatably coupled to the shaft 22, and a stator 60 disposed about the rotor 58. Typically, when the rotating machine 20 includes the electric machine 56, the first impeller wheel 30 is further defined as a first compressor wheel configured to deliver compressed air, the second impeller wheel 32 is further defined as a second compressor wheel configured to deliver compressed air, and the electric machine 56 is configured to transmit torque to the shaft 22 to rotate the first and second compressor wheels. In such embodiments, the shaft rotates the first and second compressor wheels are rotated as a result of the electric machine 56, rather than rotating either the first or second impeller wheel 30, 32 as a result of one of the first or second impeller wheels 30, 32 receiving a working fluid, such as exhaust gas.

In one embodiment, the first and second impeller wheels 30, 32 may be further defined as a turbine wheel configured to receive a working fluid and a compressor wheel configured to deliver a working fluid, respectively. In such embodiments, the electric machine 56 may be configured as an electric motor for delivering rotational torque to the shaft 22 and/or may be configured as a generator for receiving rotational torque to the shaft 22 to convert mechanical energy into electrical energy. In embodiments where the rotating machine 20 is used in an organic Rankine cycle waste heat recover system as a turbine expander, the first impeller wheel 30 may be further defined as a turbine wheel and the rotating machine 20 may include the electric machine 56 configured as a generator and/or an electric motor.

Figure 6:
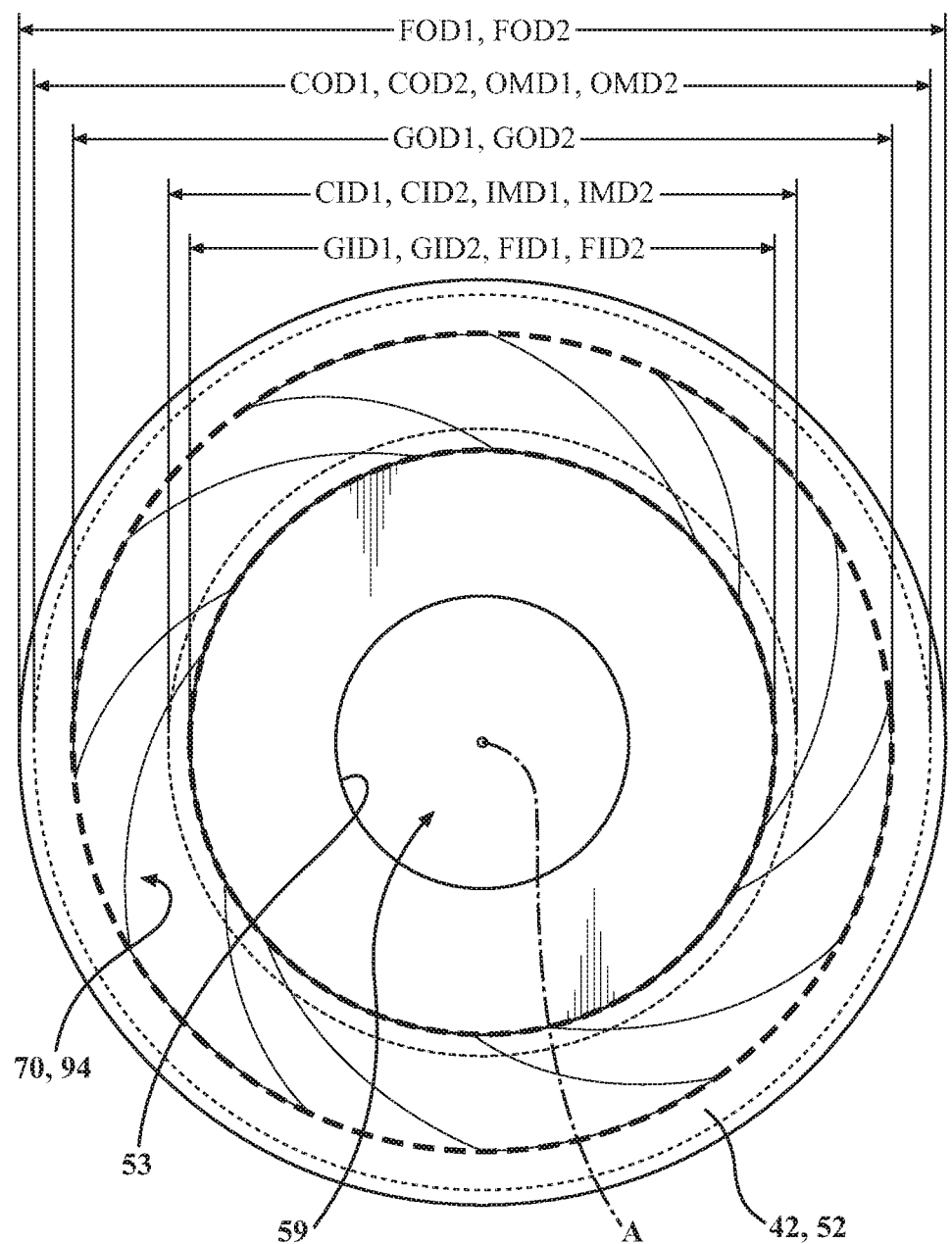
FIG. 6 is a top view of a mating surface of the mating ring, with the mating surface having a land portion and an inner mating diameter adapted to be radially aligned with a carbon ring inner diameter with respect to the axis and an outer mating diameter adapted to be radially aligned with a carbon ring outer diameter with respect to the axis.

With reference to FIG. 6, the first carbon surface 38 may have a first carbon ring inner diameter CID1 and a first carbon ring inner outer COD1 spaced from the first carbon ring inner diameter CID1 radially away from the axis A. The first mating surface 42 may have a first land portion 70 configured to contact the first carbon surface 38 between a first inner mating diameter IMD1 radially aligned with the first carbon ring inner diameter CID1 with respect to the axis A and a first outer mating diameter OMD1 radially aligned with the first carbon ring inner outer COD1 with respect to the axis A. The first carbon ring 36 is removed in FIG. 6 such that the first mating ring 40 and first mating surface 42 is shown clearly. The first carbon ring inner diameter CID1 and first carbon ring inner outer COD1 are shown with respect to the first mating surface 42 to illustrate where the first carbon surface 38 contacts the first mating surface 42.

Figure 7:
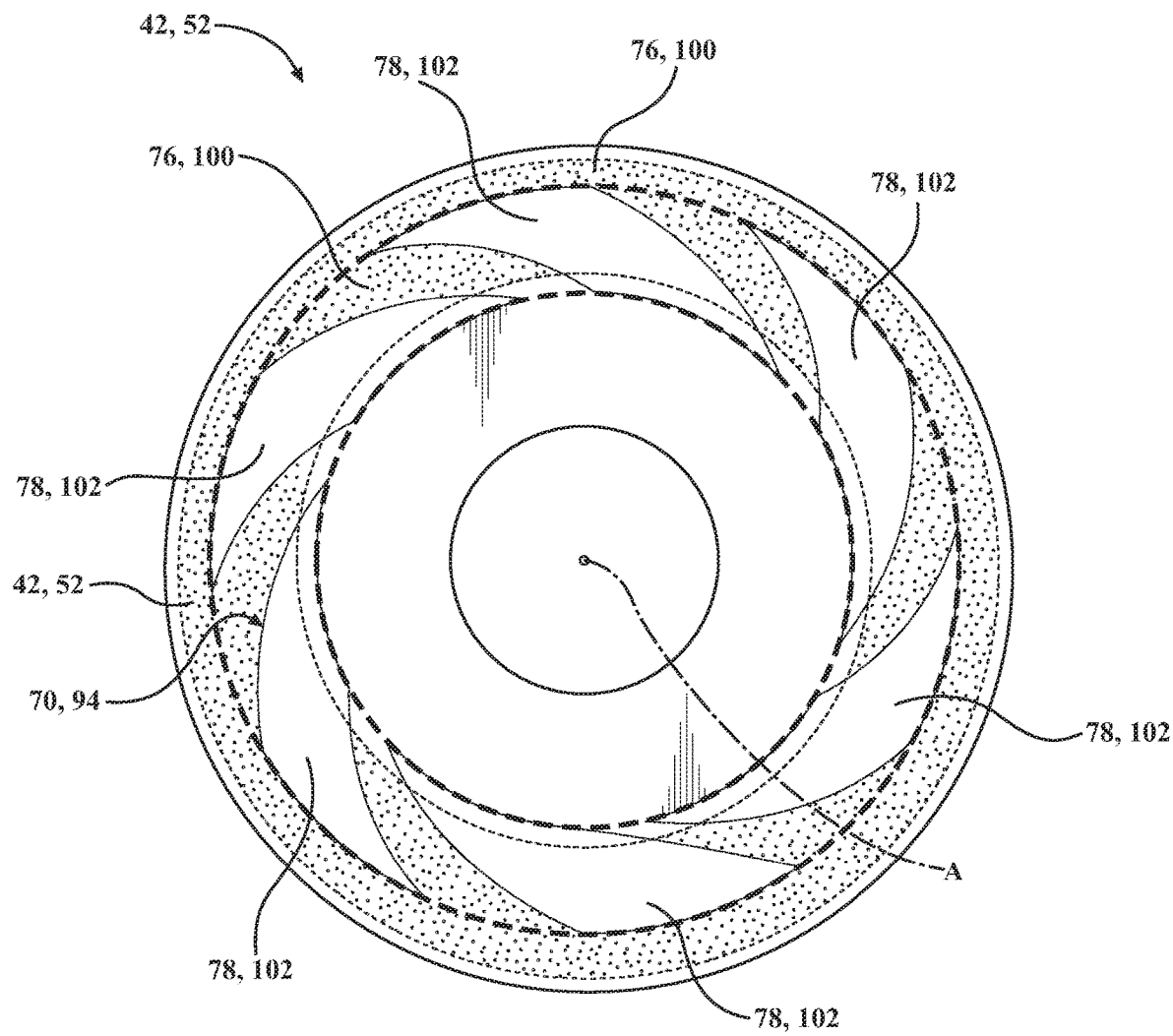
FIG. 7 is a top view of the mating surface of the mating ring, with the land portion having a land area between the inner and outer mating diameters, and with the land area shaded.

With reference to FIGS. 6 and 7, the first land portion 70 may have a first land area 76 between the first inner and first outer mating diameters IMD1, OMD1, with first mating surface 42 defining a first plurality of grooved portions 78 disposed about the axis A. The first plurality of grooved portions 78 may have a first grooved area 80 between the first inner and first outer mating diameters IMD1, OMD1. A ratio of the first land area 76 to the first grooved area 80 is typically between 1.3 and 2.9.

Having the ratio of the first land area 76 to the first grooved area 80 between 1.3 and 2.9 ensures that the first carbon ring 36 lifts off, i.e., becomes disengaged, from the first mating ring 40 at the optimal rotational speed from a fluid pressure, which may be caused by lubricant or air, exiting the first plurality of grooved portions 78 caused by rotation of the first mating ring 40. For example, having the first carbon ring 36 lift off from the first mating ring 40 reduces mechanical losses of the rotating machine 20 and improves durability of the rotating machine 20. Specifically, the ratio of the first land area 76 to the first grooved area 80 between 1.3 and 2.9 improves durability of the first carbon ring 36, and reduces mechanical losses caused by the first carbon ring 36 and the first mating ring 40 remaining in contact for too long. The ratio of the first land area 76 to the first grooved area 80 between 1.3 and 2.9 is optimal for ensuring lift off of the first carbon ring 36 from the first mating ring 40 does not occur at too low or too high of a rotational speed of the first mating ring 40.

Figure 11:
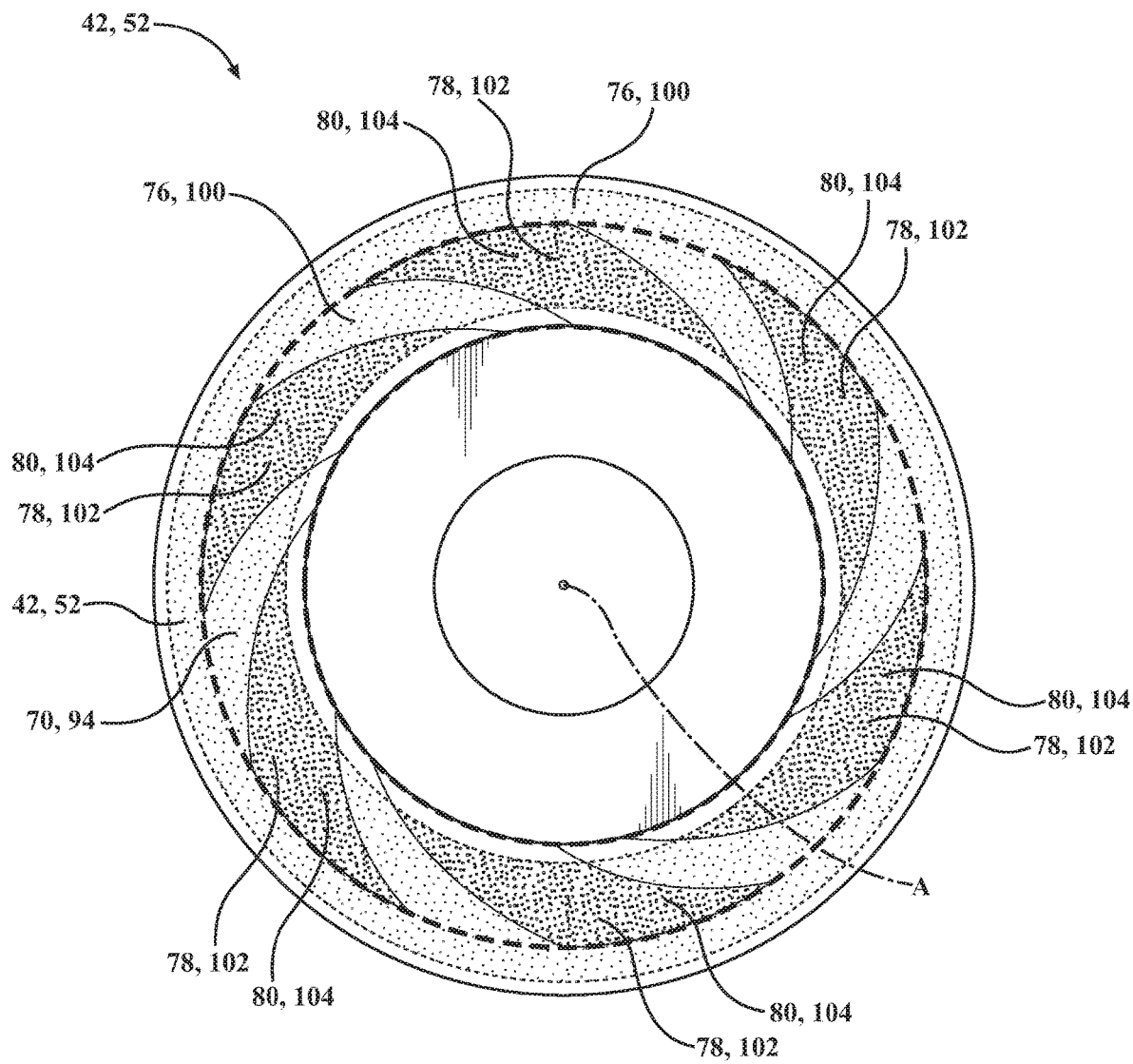
FIG. 11 is a top view of the mating surface of the mating ring, with the land area shown as lightly shaded and the grooved area shown as dark shaded.

The ratio of the first land area 76 to the first grooved area 80 is shown in FIG. 11, where the light shaded area is the first land area 76 and the dark shaded area is the first grooved area 80. Specifically, the first grooved area 80 includes all of the dark shaded area in FIG. 11, and the first land area 76 includes all of the light shaded area in FIG. 11. As described above, the ratio of the light shaded area, i.e., the first land area 76, to the dark shaded area, i.e., the first grooved area 80, may be between 1.3 and 2.9. In one embodiment, the ratio of the first land area 76 to the first grooved area 80 may be between 1.75 and 2.75. In another embodiment, the ratio of the first land area 76 to the first grooved area 80 may be 1.4. In another embodiment, the ratio of the first land area 76 to the first grooved area 80 may be 1.5. In another embodiment, the ratio of the first land area 76 to the first grooved area 80 may be 1.6. In another embodiment, the ratio of the first land area 76 to the first grooved area 80 may be 1.7. In another embodiment, the ratio of the first land area 76 to the first grooved area 80 may be 1.8. In another embodiment, the ratio of the first land area 76 to the first grooved area 80 may be 1.9. In another embodiment, the ratio of the first land area 76 to the first grooved area 80 may be 2.0. In another embodiment, the ratio of the first land area 76 to the first grooved area 80 may be 2.1. In another embodiment, the ratio of the first land area 76 to the first grooved area 80 may be 2.2. In another embodiment, the ratio of the first land area 76 to the first grooved area 80 may be 2.3. In another embodiment, the ratio of the first land area 76 to the first grooved area 80 may be 2.4. In another embodiment, the ratio of the first land area 76 to the first grooved area 80 may be 2.5. In another embodiment, the ratio of the first land area 76 to the first grooved area 80 may be 2.6. In another embodiment, the ratio of the first land area 76 to the first grooved area 80 may be 2.7. In another embodiment, the ratio of the first land area 76 to the first grooved area 80 may be 2.8. In another embodiment, the ratio of the first land area 76 to the first grooved area 80 may be 2.9.

Figure 10:
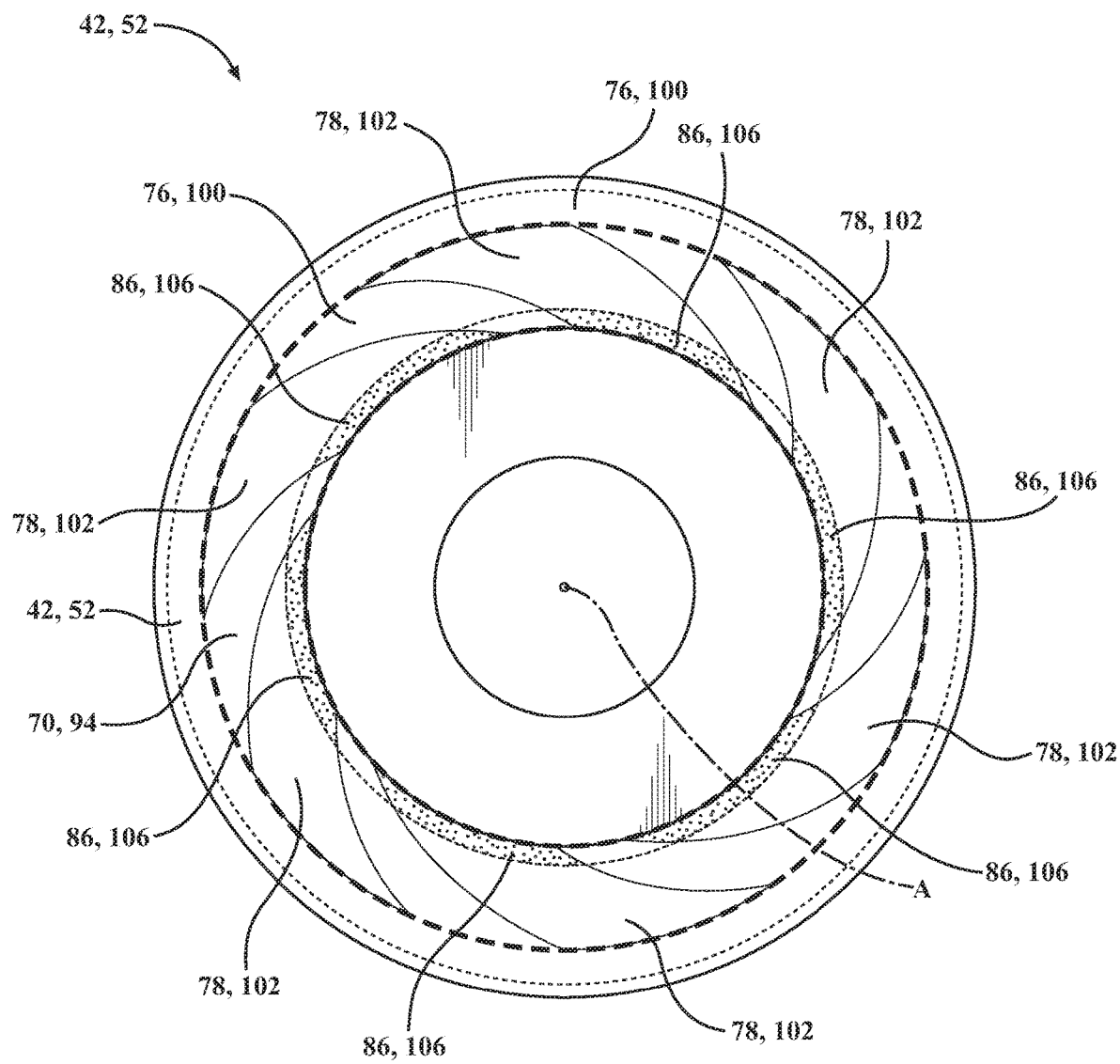
FIG. 10 is a top view of the mating surface of the mating ring, with the plurality of grooved portions having an inactive groove area that is not between the inner and outer mating diameters, and with the inactive grooved area shaded.

Typically, the first plurality of grooved portions 78 are spiraled about the axis A, as shown in FIGS. 6-11. With reference to FIG. 6, the first plurality of grooved portions 78 may have a first groove inner diameter GID1, with a ratio of the first carbon ring inner diameter CID1 to the first groove inner diameter GID1 being greater than 1.0. When the ratio of the first carbon ring inner diameter CID1 to the first groove inner diameter GID1 is adapted to be greater than 1.0, the first plurality of grooved portions 78 extends beyond the first carbon ring inner diameter CID1 and inward toward the axis A, as shown in FIG. 6. As shown in FIG. 10, the first plurality of grooved portions 78 extends beyond the first carbon ring inner diameter CID1 and inward toward the axis A, which results in the first plurality of grooved portions 78 having a first inactive groove area 86 (or second inactive groove area 106 of a second plurality of grooved portions 102), which is shown in FIG. 10 as the shaded area of the first plurality of grooved portions 78. Having the first plurality of grooved portions 78 extending beyond the first carbon ring inner diameter CID1 and inward toward the axis A allows the first plurality of grooved portions 78 to maintain fluid communication to the first carbon surface 38 adjacent the first carbon ring inner diameter CID1 to promote "lift off" of the first carbon ring 36. In other words, the first plurality of grooved portions 78 is open at the first groove inner diameter GID1 such that the first plurality of grooved portions 78 are able to direct fluid toward the first groove outer diameter GOD1 to generate enough fluid pressure to "lift off" the first carbon ring 36. Typically, the ratio of the first carbon ring inner diameter CID1 to the first groove inner diameter GID1 is less than 1.2. Having the ratio of the first carbon ring inner diameter CID1 to the first groove inner diameter GID1 less than 1.2 allows the first carbon ring 36 to be smaller in size, which results in better packaging of the first mating ring 40 and the first carbon ring 36, which ultimately results in less space occupied in the rotating machine 20. In one embodiment, the ratio of the first carbon ring inner diameter CID1 to the first groove inner diameter GID1 is between 1.02 and 1.10. In one embodiment, the ratio of the first carbon ring inner diameter CID1 to the first groove inner diameter GID1 may be adapted to be between 1.03 and 1.09. In another embodiment, the ratio of the first carbon ring inner diameter CID1 to the first groove inner diameter GID1 may be adapted to be between 1.04 and 1.08. In another embodiment, the ratio of the first carbon ring inner diameter CID1 to the first groove inner diameter GID1 may be adapted to be between 1.05 and 1.07. In another embodiment, the ratio of the first carbon ring inner diameter CID1 to the first groove inner diameter GID1 may be adapted to be 1.05. Having the first plurality of grooved portions 78 spiraled about the axis A allows the first mating ring 40 to direct fluid outwardly, which helps with the lift off of the first carbon ring 36 from the first mating ring 40. Typically, the first plurality of grooved portions 78 are spiraled about the axis A when the rotating machine 20 is a single direction machine, i.e., the shaft 22 spins only in one direction about the axis A. When the rotating machine 20 is not a single direction machine, the first plurality of grooved portions 78 may have a configuration that does not spiral about the axis A, such as T-shaped or rectangular grooves.

Figure 8:
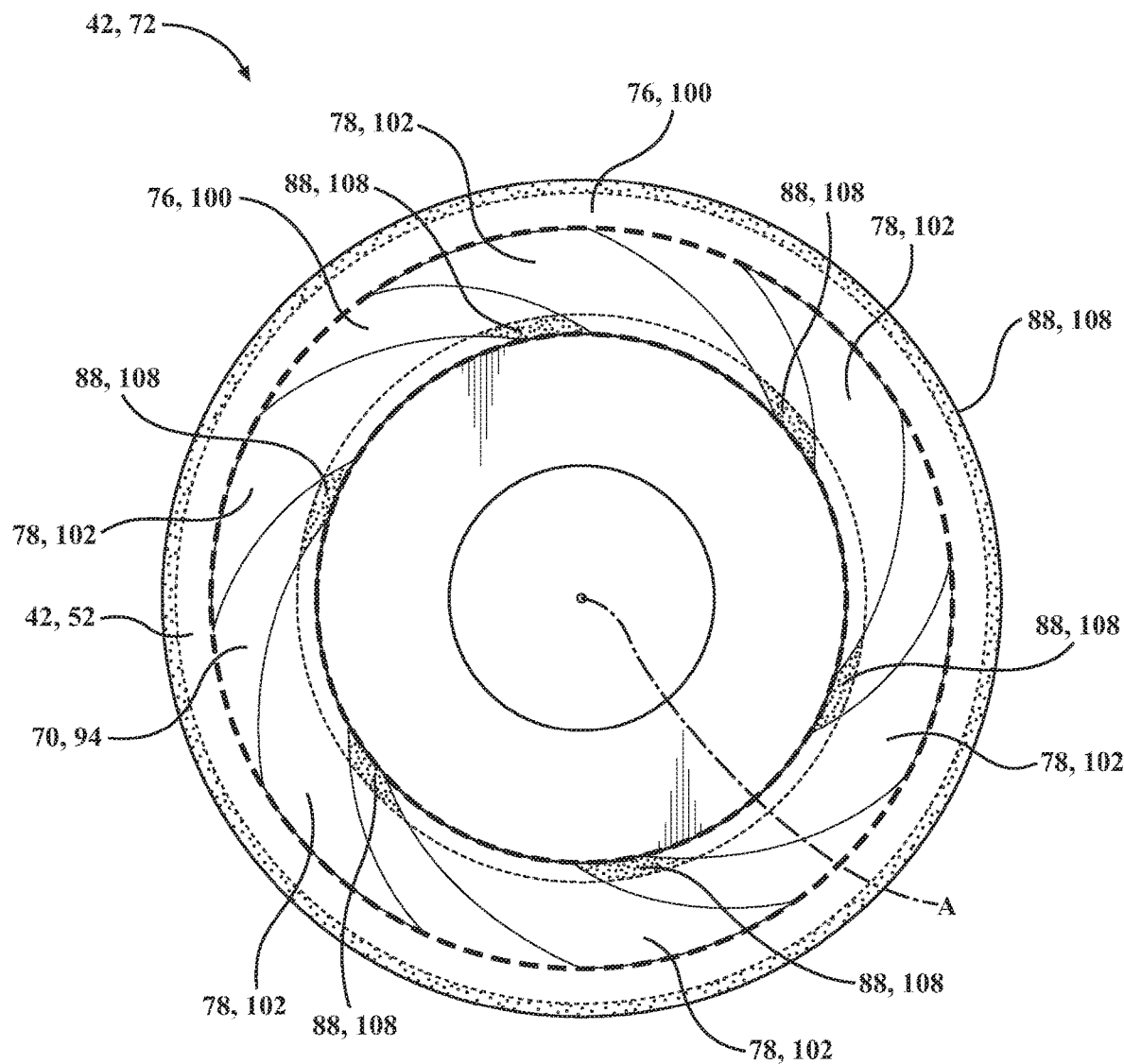
FIG. 8 is a top view of the mating surface of the mating ring, with the land portion having an inactive land area that is not between the inner and outer mating diameters, and with the inactive land area shaded.
Figure 9:
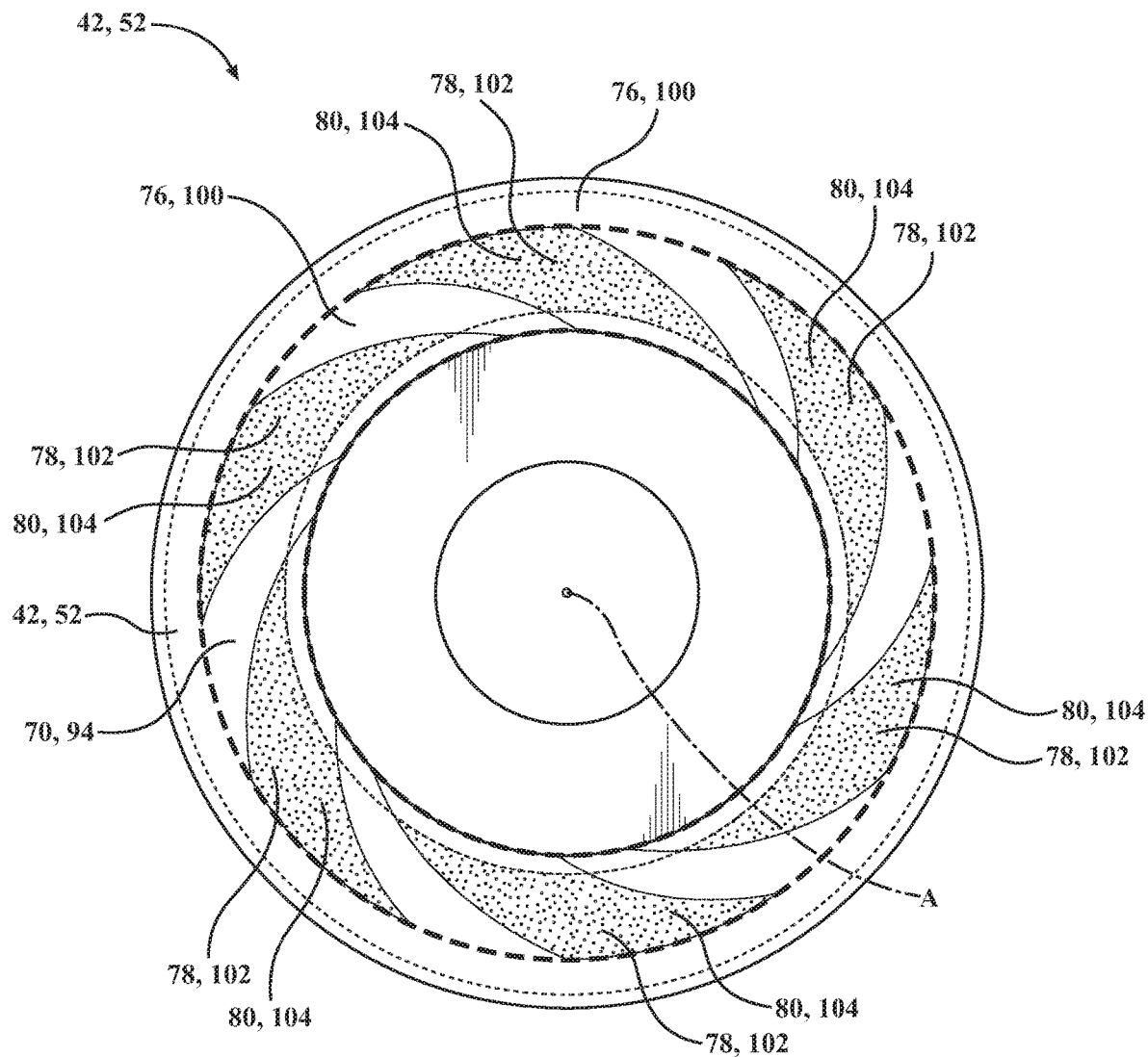
FIG. 9 is a top view of the mating surface of the mating ring, with the plurality of grooved portions having a grooved area between the inner and outer mating diameters, and with the grooved area shaded.

The first plurality of grooved portions 78 may have a first groove outer diameter GOD1, as shown in FIG. 6. A ratio of the first carbon ring inner outer COD1 to the first groove outer diameter GOD1 may be greater than 1.0. When the ratio of the first carbon ring inner outer COD1 to the first groove outer diameter GOD1 is greater than 1.0, the first carbon ring 36 extends beyond the first groove outer diameter GOD1 radially away from the axis A. As shown in FIG. 8, the first mating surface 42 may have a first inactive land area 88, which is shown in FIG. 8 as the shaded area on the first mating surface 42. When present, the first inactive land area 88 is not contacted by the first carbon surface 38. Having the first carbon ring 36 extending beyond the first groove outer diameter GOD1 radially away from the axis A allows first plurality of grooved portions 78 at the first groove outer diameter GOD1 to be sealed against the first carbon surface 38. Typically, the ratio of the first carbon ring inner outer COD1 to the first groove outer diameter GOD1 is less than 1.5. Having the ratio of the first carbon ring inner outer COD1 to the first groove outer diameter GOD1 less than 1.5 results in better packaging of the first mating ring 40 and the first carbon ring 36, which ultimately results in less space occupied in the rotating machine 20. In one embodiment, the ratio of the first carbon ring inner outer COD1 to the first groove outer diameter GOD1 is between 1.05 and 1.25. In one embodiment, the ratio of the first carbon ring inner outer COD1 to the first groove outer diameter GOD1 may be adapted to be between 1.10 and 1.20. In another embodiment, the ratio of the first carbon ring inner outer COD1 to the first groove outer diameter GOD1 may be adapted to be 1.15.

Typically, the first plurality of grooved portions 78 is further defined as having between three and ten grooves. In one embodiment, the first plurality of grooved portions 78 has between four and nine grooves. In another embodiment, the first plurality of grooved portions 78 has between five and eight grooves. In another embodiment, the first plurality of grooved portions 78 has six grooves. In yet another embodiment, the first plurality of grooved portions 78 has seven grooves. Having the first plurality of grooved portions 78 being further defined as having between three and ten grooves, although not required, is helpful to achieve the ratio of the first land area 76 to the first grooved area 80 between 1.3 and 2.9.

With reference to FIG. 6, the second carbon surface 48 has a second carbon ring inner diameter CID2 and a second carbon ring outer diameter COD2 spaced from the second carbon ring inner diameter CID2 radially away from the axis A.

For ease of illustration, the mating ring shown in FIGS. 4-11 is representative of both the first and second mating rings 40, 50. As such, elements of both the first and second mating rings 40, 50 are labeled in FIGS. 4-11.

As shown in FIGS. 6 and 7, the second mating surface 52 may have a second land portion 94 configured to contact the second carbon surface 48 between a second inner mating diameter IMD2 radially aligned with the second carbon ring inner diameter CID2 with respect to the axis A and a second outer mating diameter OMD2 radially aligned with the second carbon ring outer diameter COD2 with respect to the axis A. The second land portion 94 may have a second land area 100 between the second inner and outer mating diameters IMD2, OMD2. The second mating surface 52 may define a second plurality of grooved portions 102 disposed about the axis A. The second plurality of grooved portions 102 may have a second grooved area 104 between the second inner and outer mating diameters IMD2, OMD2, with a ratio of the second land area 100 to the second grooved area 104 being between 1.3 and 2.9.

Having the ratio of the second land area 100 to the second grooved area 104 between 1.3 and 2.9 ensures that the second carbon ring 46 lifts off, i.e., becomes disengaged, from the second mating ring 50 at the optimal rotational speed from a fluid pressure, which may be caused by lubricant or air, exiting the second plurality of grooved portions 102 caused by rotation of the second mating ring 50. For example, having the second carbon ring 46 lift off from the second mating ring 50 reduces mechanical losses of the rotating machine 20 and improves durability of the rotating machine 20. Specifically, the ratio of the second land area 100 to the second grooved area 104 between 1.3 and 2.9 improves durability of the second carbon ring 46, and reduces mechanical losses caused by the second carbon ring 46 and the second mating ring 50 remaining in contact for too long. The ratio of the second land area 100 to the second grooved area 104 between 1.3 and 2.9 is optimal for ensuring lift off of the second carbon ring 46 from the second mating ring 50 does not occur at too low or too high of a rotational speed of the second mating ring 50.

The ratio of the second land area 100 to the second grooved area 104 is shown in FIG. 11, where the light shaded area is the second land area 100 and the dark shaded area is the second grooved area 104. Specifically, the second grooved area 104 includes all of the dark shaded area in FIG. 11, and the second land area 100 includes all of the light shaded area in FIG. 11. As described above, the ratio of the light shaded area, i.e., the second land area 100, to the dark shaded area, i.e., the second grooved area 104, may be between 1.3 and 2.9. In one embodiment, the ratio of the second land area 100 to the second grooved area 104 may be between 1.75 and 2.75. In another embodiment, the ratio of the second land area 100 to the second grooved area 104 may be 1.4. In another embodiment, the ratio of the second land area 100 to the second grooved area 104 may be 1.5. In another embodiment, the ratio of the second land area 100 to the second grooved area 104 may be 1.6. In another embodiment, the ratio of the second land area 100 to the second grooved area 104 may be 1.7. In another embodiment, the ratio of the second land area 100 to the second grooved area 104 may be 1.8. In another embodiment, the ratio of the second land area 100 to the second grooved area 104 may be 1.9. In another embodiment, the ratio of the second land area 100 to the second grooved area 104 may be 2.0. In another embodiment, the ratio of the second land area 100 to the second grooved area 104 may be 2.1. In another embodiment, the ratio of the second land area 100 to the second grooved area 104 may be 2.2. In another embodiment, the ratio of the second land area 100 to the second grooved area 104 may be 2.3. In another embodiment, the ratio of the second land area 100 to the second grooved area 104 may be 2.4. In another embodiment, the ratio of the second land area 100 to the second grooved area 104 may be 2.5. In another embodiment, the ratio of the second land area 100 to the second grooved area 104 may be 2.6. In another embodiment, the ratio of the second land area 100 to the second grooved area 104 may be 2.7. In another embodiment, the ratio of the second land area 100 to the second grooved area 104 may be 2.8. In another embodiment, the ratio of the second land area 100 to the second grooved area 104 may be 2.9.

In embodiments where the ratio of the first land area 76 to the first grooved area 80 is between 1.3 and 2.9 and where the ratio of the second land area 100 to the second grooved area 104 is between 1.3 and 2.9, the first plurality of grooved portions 78 may be spiraled about the axis A, and the second plurality of grooved portions 102 may be spiraled about the axis A. In such embodiments, as shown in FIG. 6, the first plurality of grooved portions 78 may have the first groove inner diameter GID1, with a ratio of the first carbon ring inner diameter CID1 to the first groove inner diameter GID1 being greater than 1.0, with the second plurality of grooved portions 102 having a second groove inner diameter GID2, and with a ratio of the second carbon ring inner diameter GID2 to the second groove inner diameter GID2 being greater than 1.0. The ratio of the first carbon ring inner diameter CID1 to the first groove inner diameter GID1 may be between 1.02 and 1.10, and the ratio of the second carbon ring inner diameter CID2 to the second groove inner diameter GID2 may be between 1.02 and 1.10.

In embodiments where the ratio of the first land area 76 to the first grooved area 80 is between 1.3 and 2.9 and where the ratio of the second land area 100 to the second grooved area 104 is between 1.3 and 2.9, the first plurality of grooved portions 78 may have the first groove outer diameter GOD1, with the ratio of the first carbon ring inner outer COD1 to the first groove outer diameter GOD1 being greater than 1.0, and the second plurality of grooved portions 102 may have a second groove outer diameter GOD2, with a ratio of the second carbon ring outer diameter COD2 to the second groove outer diameter GOD2 being greater than 1.0. In such embodiments, the ratio of the first carbon ring inner outer COD1 to the first groove outer diameter GOD1 may be between 1.05 and 1.25, and the ratio of the second carbon ring outer diameter COD2 to the second groove outer diameter GOD2 may be between 1.05 and 1.25. As described above with respect to the first plurality of grooved portions 78, it is to be appreciated that the second plurality of grooved portions 102 may be further defined as having between three and ten grooves. As shown in FIG. 8, the second mating surface 52 may have a second inactive land area 108, which is shown in FIG. 8 as the shaded area on the second mating surface 52. When present, the second inactive land area 108 is not contacted by the second carbon surface 48.

Typically, the first plurality of grooved portions 78 are defined into the first mating surface 42. It is to be appreciated that the description below of various features of the first plurality of grooved portions 78 may also apply to the second plurality of grooved portions 102. For example, the second plurality of grooved portions 102 may be defined into the second mating surface 52. The first plurality of grooved portions 78 may be etched, such as through etching or laser etching, into the first mating surface 42. The first plurality of grooved portions 78 may be etched or laser etched into the first mating surface 42 at a right angle. It is to be appreciated that the first plurality of grooved portions 78 may have a non-uniform depth, which may result in the first plurality of grooved portions 78 being etched into the first mating surface 42 at a non-right angle. Typically, the first plurality of grooved portions 78 have a depth defined into the first mating surface 42 greater than 0.005 mm. Having the first plurality of grooved portions 78 having a depth defined into the first mating surface 42 greater than 0.005 mm allows the first plurality of grooved portions 78 to still be effective during operation despite carbon deposits in the first plurality of grooved portions 78. Typically, the first plurality of grooved portions 78 have a depth defined into the first mating surface that is less than 0.040 mm. Having the first plurality of grooved portions 78 having a depth defined into the first mating surface 42 that is less than 0.040 mm reduces time needed to manufacture the first plurality of grooved portions 78, for example though etching or laser etching. As such, the first plurality of grooved portions 78 typically have a depth defined into the first mating surface 42 between 0.005 mm to 0.040 mm. Having a depth of the first plurality of grooved portions 78 between 0.005 mm and 0.040 mm allows both the first plurality of grooved portions 78 to still be effective during operation despite carbon deposits in the first plurality of grooved portions 50, and reduces the time needed to manufacture the first plurality of grooved portions 50, for example though etching or laser etching. In one embodiment, the depth of the first plurality of grooved portions 78 may be between 0.010 mm and 0.035 mm. In another embodiment, the depth of the first plurality of grooved portions 78 may be between 0.015 mm and 0.030 mm. In another embodiment, the depth of the first plurality of grooved portions 78 may be between 0.020 mm and 0.025 mm.

Figure 2:
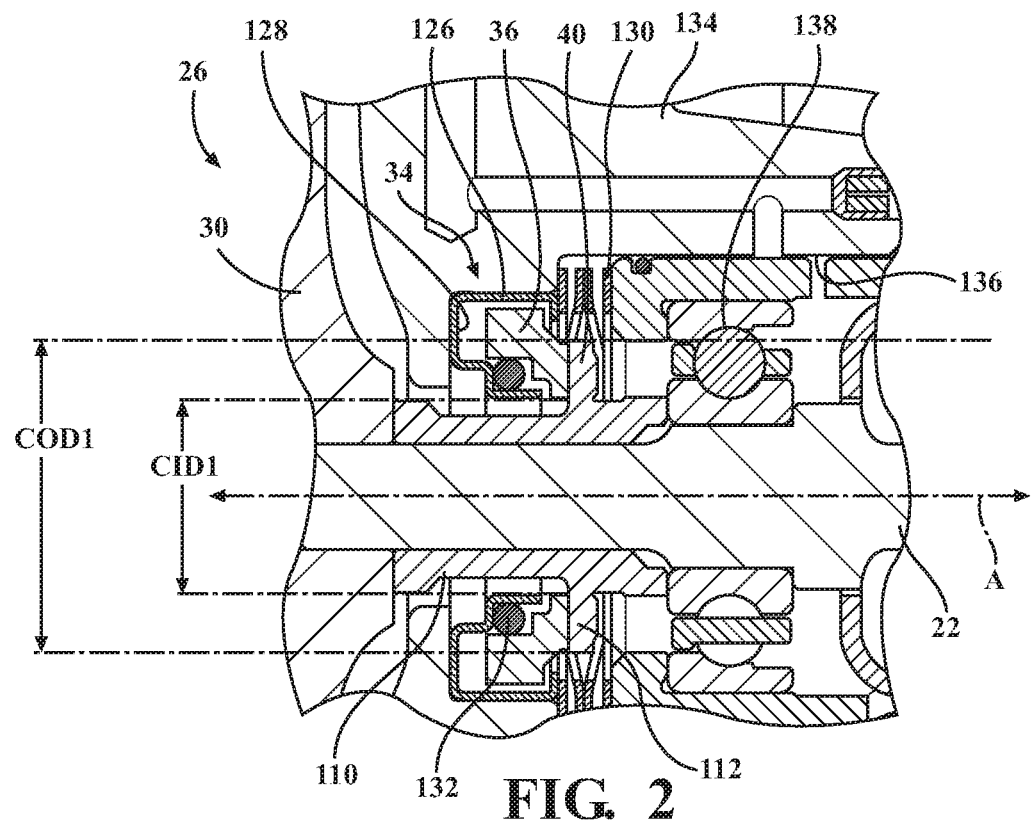
FIG. 2 is close-up view of the first seal assembly of FIG. 1.

With reference to FIG. 2, the first mating ring 40 may include a first cylindrical sleeve 110 coupled to and rotatable with the shaft 22, and a first flange 112 extending radially from the first cylindrical sleeve 110 such that the first mating ring 40 is configured as a flinger, with the first cylindrical sleeve 110 extending from the first flange 112 toward the first impeller wheel 30. The first flange 112 may have a first flange inner diameter FID1 and a first flange outer diameter FOD1 radially spaced from the first flange inner diameter FID1 with respect to the axis A, as shown in FIG. 6. Additionally, when the first mating ring 40 is configured as a flinger, the first mating ring 40 directs fluid outwardly during rotation of the shaft 22 to direct fluid to separate the first carbon ring 36 and the first mating ring 40. It is to be appreciated that when the first mating ring 40 is configured as a flinger that the first mating ring 40 may also be referred to as a flinger sleeve. It is to be appreciated that a surface facing opposite the first mating surface 42 may be configured as a thrust bearing runner surface. Similarly, as shown in FIG. 3, the second mating ring 50 may include a second cylindrical sleeve 118 coupled to and rotatable with the shaft 22, and a second flange 120 extending radially from the second cylindrical sleeve 118 such that the second mating ring 50 is configured as a flinger, with the second cylindrical sleeve 118 extending from the second flange 120 toward the second impeller wheel 32. Similarly, the second flange 120 may have a second flange inner diameter FID2 and a second flange outer diameter FOD2 radially spaced from the second flange inner diameter FID2 with respect to the axis A, as shown in FIG. 6.

With reference to FIG. 4, the first seal assembly 34 may include a seal housing 126 defining a seal housing interior 128. It is to be appreciated that the description of various features of the first seal assembly 34 equally applies to the second seal assembly 44. For example, the first seal assembly 34 may include the seal housing 126 and the second seal assembly 44 may include a separate seal housing 126. When the seal housing 126 is present, the first carbon ring 36 is disposed in the seal housing interior 128. The first seal assembly 34 may also include a biasing member 130 disposed in the seal housing interior 128. When present, the biasing member 130 is coupled to the seal housing 126 and the first carbon ring 36 such that the biasing member 130 is adapted to bias the first carbon ring 36 toward the first mating ring 40. Specifically, when present, the biasing member 130 is adapted to bias the first carbon surface 38 toward the first mating surface 42. In one embodiment, the biasing member 130 is a spring. The first seal assembly 34 may include a secondary seal 132 coupled to the first seal housing 126 and the first carbon ring 36 to prevent leakage of lubricant. In one embodiment, the secondary seal 132 is an O-ring seal.

It is to be appreciated that the description of the first carbon ring 36 below may equally apply the second carbon ring 46 and corresponding components. The first carbon ring 36 may be moveable between a first position where the first carbon surface 38 is engaged with the first mating surface 42 (i.e., before startup), and a second position where the first carbon surface 38 is spaced from the first mating surface 42 such that the first carbon surface 38 and the first mating surface 42 are disengaged to allow rotation of the first mating ring 40 (i.e., after startup). Typically, the first carbon surface 38 and the first mating surface 42 define a gap between one another when the first carbon ring 36 is in the second position. The gap may be between 0.5 and 4 microns. The gap defined between the first carbon surface 38 and the first mating surface 42 when the first carbon ring 36 is in the second position results in minimal efficiency loss after "lift-off." The first carbon surface 38 and the first mating surface 42 may have a gas film formed by rotation of the first mating ring 40 when the first carbon ring 36 is in the second position. As described above, the gap is typically between 0.5 and 4 microns. Having the gap defined between the first carbon surface 38 and the first mating surface 42 allows the rotating machine 20 to be oriented vertically or horizontally, whereas standard piston ring sealing systems require the rotating machine to be horizontally arranged. Additionally, when the first carbon ring 36 is in the second position, the first mating ring 40 directs lubricant radially away from the axis A during rotation of the shaft 22, which prevents lubricant from leaking to unwanted areas of the rotating machine 20, such as to the first impeller wheel 30 or other sealing systems, and helps direct lubricant flow toward a lubricant drain.

With reference to FIGS. 1-3, the rotating machine 20 may include a bearing housing 134 defining a bearing housing interior 136, a first lubricant-fed bearing 138 disposed in the bearing housing interior 136 and rotatably supporting the shaft 22 at the first end 26 of the shaft, and a second lubricant-fed bearing 140 disposed in the bearing housing interior 136 and rotatably supporting the shaft 22 at the second end 28 of the shaft 22. The first and/or second lubricant-fed bearings 138, 140 may be provided lubricant from a lubricant passage 141, which may be defined within the bearing housing 134. When the rotating machine includes the first lubricant-fed bearing 138 and the second lubricant-fed bearing 140, the first seal assembly 34 having the first mating ring 40 and first carbon ring 36, and the second seal assembly 44 having the second mating ring 50 and the second carbon ring 46 reduces leakage of lubricant to the first and second impeller wheels 30, 32, respectively, which overall increases longevity of the rotating machine 20. Additionally, performance of the rotating machine 20 is increased because first and second lubricant-fed bearings 138, 140 may be used as a result of the first seal assembly 34 having the first mating ring 40 and first carbon ring 36, and the second seal assembly 44 having the second mating ring 50 and the second carbon ring 46. The first and second lubricant-fed bearings 138, 140 may be any suitable lubricant-fed bearing, such as a ball bearing. For example, as described in further detail below, utilizing lubricant-fed bearings improves performance and longevity of the rotating machine 20, and having the first and second seal assemblies 34, 44 allows the rotating machine 20 to utilize lubricant-fed bearings as the first and second seal assemblies 34, 44 reduce, if not eliminate, any contaminants from the lubricant from reaching the first and second impeller wheels 30, 32.

For ease of illustration, it is to be appreciated that the seal assembly, carbon ring, carbon surface, mating ring, lubricant-fed bearing, carbon ring inner diameter, carbon ring outer diameter, land portion, inner mating diameter, outer mating diameter, land area, plurality of grooved portions, and grooved area described below are labeled in FIGS. 4-12 using element labels of the first seal assembly 34, first carbon ring 36, first carbon surface 38, first mating ring 40, first lubricant-fed bearing 138, first carbon ring inner diameter CID1, first carbon ring outer diameter COD1, first land portion 70, first inner mating diameter IMD1, first outer mating diameter OMD1, first land area 76, first plurality of grooved portions 78, and first grooved area 80.

Figure 13:
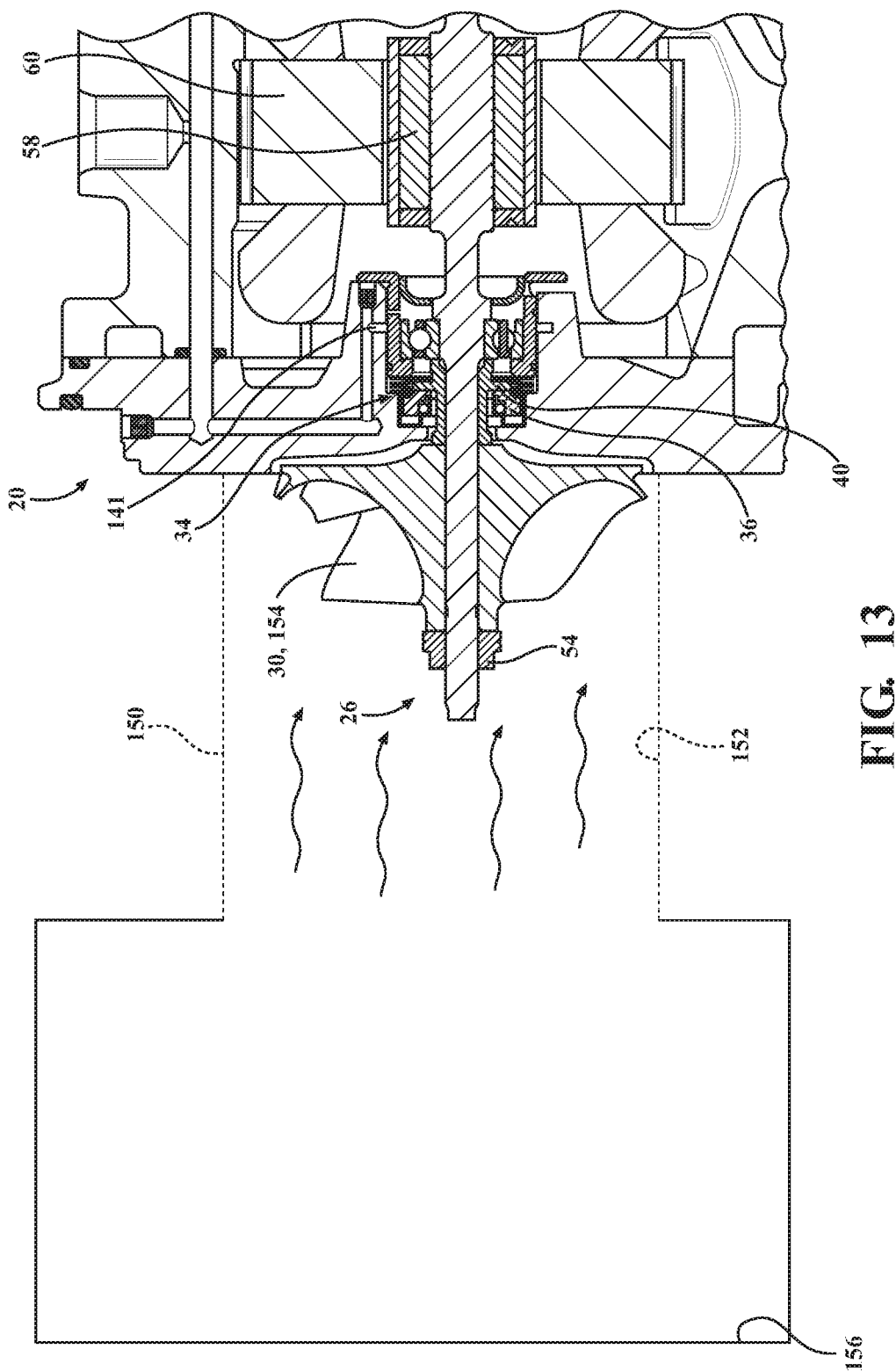
FIG. 13 is a cross-sectional view of a system including the rotating machine, with the rotating machine including an impeller housing defining an impeller housing interior, and with the impeller housing interior being fluidly coupled to a contaminant free environment.

In another embodiment, as shown in FIG. 13, the rotating machine 20 includes the bearing housing 134 defining the bearing housing interior 136, the shaft 22 extending along the axis A between the first end 26 and the second end 28 spaced from the first end 26 along the axis A, with the shaft 22 disposed in the bearing housing interior 136. The rotating machine 20 also includes an impeller housing 150 coupled to the bearing housing 134. It is to be appreciated that the impeller housing 150 and the bearing housing 134 may be integral with one another (i.e., one-piece), or may be separate components (i.e., two or more pieces). The impeller housing 150 defines an impeller housing interior 152. The rotating machine 20 further includes an impeller wheel 154 coupled to the shaft 22 at the first end 26 and disposed in the impeller housing interior 152. The rotating machine 20 additionally includes a seal assembly 34 disposed in the bearing housing interior 136. The seal assembly 34 includes a carbon ring 36 disposed about the shaft 22 and spaced from the impeller wheel 154 along the axis A, with the carbon ring 36 having a carbon surface 38, and a mating ring 40 disposed about the shaft 22 and spaced from the impeller wheel 154 along the axis A such that the carbon ring 36 is disposed between the impeller wheel 154 and the mating ring 40, with the mating ring 40 having a mating surface 42 facing and configured to contact the carbon surface 38. The rotating machine 20 further includes a lubricant-fed bearing 138 disposed in the bearing housing interior 136 and rotatably supporting the shaft 22 at the first end 26, with the seal assembly 34 disposed between the lubricant-fed bearing 138 and the impeller wheel 154 with respect to the axis A. The rotating machine 20 also includes the electric machine 56 including the rotor 58 rotatably coupled to the shaft 22, and the stator 60 disposed about the rotor 58. The electric machine 56 may be configured as an electric motor for delivering rotational to the shaft 22 to rotate the impeller wheel 154, and/or may be configured as a generator for receiving rotational torque to the shaft 22 to convert mechanical energy into electrical energy. The impeller housing interior 152 is adapted to be fluidly coupled to a contaminant free environment 156, with the carbon ring 36 and the mating ring 40 preventing lubricant from entering the contaminant free environment 156.

Having the mating ring 40 and the carbon ring 36 prevent lubricant from and other contaminants from entering the impeller housing interior 152 allows the impeller housing interior 152 to be fluidly coupled to the contaminant free environment 156. An example of a contaminant free environment is a fuel cell, as described in further detail below. Another example of a contaminant free environment is an organic Rankine cycle waste heat recovery system.

When the rotating machine 20 is used in an organic Rankine cycle waste heat recovery system, the impeller wheel 154 may be further defined as a turbine wheel configured to receive a working fluid, and the impeller housing 150 may be further defined as a turbine housing. In such embodiments, the turbine housing defines a turbine housing interior that is fluidly coupled to a contaminant free environment. Further, in such embodiments, the rotating machine 20 may include the electric machine 56, with the electric machine 56 being configured as a generator. Additionally, in such embodiments, the turbine wheel may be the only impeller wheel rotatably coupled to the shaft 22. When the impeller housing 150 is further defined as a turbine housing, the turbine housing interior, being fluidly coupled to the contaminant free environment, may also then be considered part of the contaminant free environment.

Any contaminant free environment that is sensitive to any form of hydrocarbons and other contaminants, the mating ring 40 and the carbon ring 36 reduce, if not eliminate, hydrocarbons and other contaminants from the lubricant from entering the contaminant free environment. Another example of a contaminant free environment may be in an atmospheric water generator, in which water is recovered from air vapor.

In one embodiment, the impeller housing 150 is further defined as a compressor housing, the impeller housing interior 152 is further defined as a compressor housing interior, and the impeller wheel 154 is further defined as a compressor wheel configured to deliver a working fluid, such as air. When the impeller housing 150 is further defined as a compressor housing, the compressor housing interior, being fluidly coupled to the contaminant free environment 156, may also then be considered part of the contaminant free environment 156.

In such embodiments where the impeller housing interior 152 is adapted to be fluidly coupled to the contaminant free environment 156, the rotating machine 20 may, as described above, include the second impeller wheel 32. In such embodiments, the first impeller wheel 30 may be further defined as a compressor wheel configured to deliver a working fluid or may be further defined as a turbine wheel configured to receive a working fluid. Further, in such embodiments, the second impeller wheel 32 may be a further defined as a compressor wheel configured to deliver a working fluid, or as a turbine wheel configured to receive a working fluid. It is to be appreciated that when the second impeller wheel 32 is present, that the rotating machine 20 may optionally include the second seal assembly 44 as described above. As described above, in embodiments where the rotating machine 20 is used in an organic Rankine waste heat recovery system, the second impeller wheel 32 may be further defined as a pump impeller for pumping the working fluid in the organic Rankine cycle waste heat recovery system. In such embodiments, the impeller housing 150 may be further defined as a pump housing defining a pump interior. Further, in such embodiments, the pump housing interior, being fluidly coupled to the contaminant free environment 156, may also then be considered part of the contaminant free environment 156.

In embodiments where the impeller housing interior 152 is adapted to be fluidly coupled to the contaminant free environment 156, with the carbon ring 36 and the mating ring 40 preventing lubricant from entering the contaminant free environment, the carbon surface 38 may have a carbon ring inner diameter CID1 and a carbon ring outer diameter COD1 spaced from the carbon ring inner diameter CID1 radially away from the axis A. In such embodiments, the mating surface 42 has a land portion 70 configured to contact the carbon surface 38 between an inner mating diameter IMD1 radially aligned with the carbon ring inner diameter CID1 with respect to the axis A and an outer mating diameter OMD1 radially aligned with the carbon ring outer diameter COD1 with respect to the axis A. In such embodiments, the land portion 70 has a land area 76 between the inner and outer mating diameters IMD1, OMD1, the mating surface 42 defines a plurality of grooved portions 78 disposed about the axis A, and the plurality of grooved portions 78 have a grooved area 80 between the inner and outer mating diameters IMD1, OMD1, and with a ratio of the land area 76 to the grooved area 80 is between 1.3 and 2.9.

Figure 12:
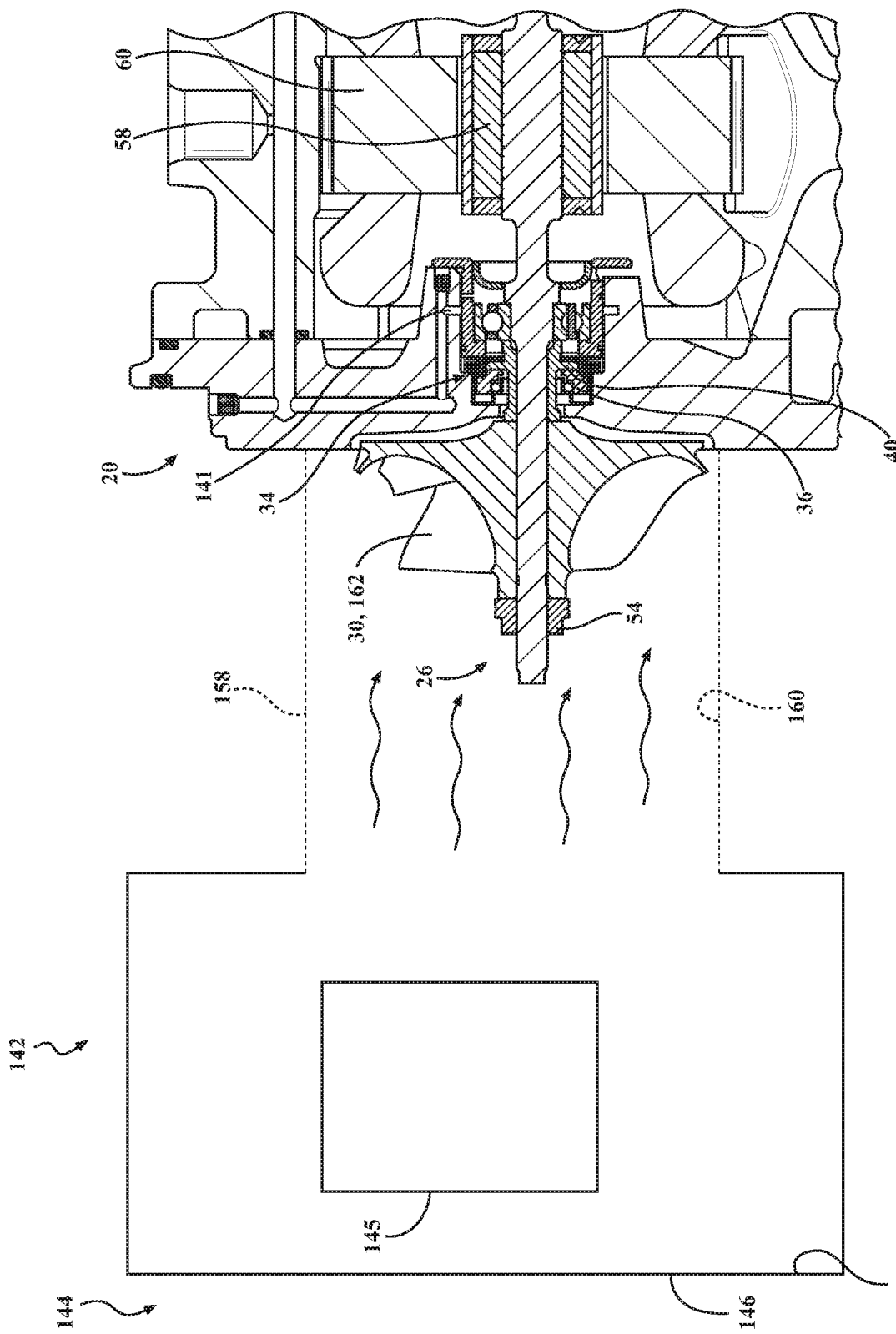
FIG. 12 is a cross-sectional view of a system including the rotating machine and a fuel cell assembly, with the fuel cell assembly including a fuel cell housing defining a fuel cell interior, and a fuel cell disposed in the fuel cell interior.

With reference to FIG. 12, a system 142 includes the rotating machine 20 including the bearing housing 134 defining the bearing housing interior 136, and the shaft 22 extending along the axis A between the first end 26 and the second end 28 spaced from the first end 26 along the axis A, with the shaft 22 disposed in the bearing housing interior 136. In the system 142, the rotating machine 20 also includes a compressor housing 158 coupled to the bearing housing 134, with the compressor housing 158 defining a compressor housing interior 160, a compressor wheel 162 coupled to the shaft 22 at the first end 26 and disposed in the compressor housing interior 160, and the seal assembly 34 disposed in the bearing housing interior 136. The seal assembly 34 includes the carbon ring 36 disposed about the shaft 22 and spaced from the compressor wheel 162 along the axis A, with the carbon ring 36 having the carbon surface 38, and the mating ring 40 disposed about the shaft 22 and spaced from the compressor wheel 162 along the axis A such that the carbon ring 36 is disposed between the compressor wheel 162 and the mating ring 40, with the mating ring 40 having the mating surface 42 facing and configured to contact the carbon surface 38. The rotating machine 20 additionally includes the lubricant-fed bearing 138 disposed in the bearing housing interior 136 and rotatably supporting the shaft 22 at the first end 26, with the seal assembly 34 disposed between the lubricant-fed bearing 138 and the compressor wheel 162 with respect to the axis A, and the electric machine 56 including the rotor 58 rotatably coupled to the shaft 22, and stator 60 disposed about the rotor 58, with the electric machine 56 being configured to transmit torque to the shaft 22 to rotate the compressor wheel 162. The system 142 also includes a fuel cell assembly 144, which is shown schematically in FIG. 12, including a fuel cell housing 146 defining a fuel cell interior 148, and a fuel cell 145 disposed in the fuel cell interior 148. The compressor housing 158 is coupled to the fuel cell housing 146, and the compressor housing interior 160 is fluidly coupled to the fuel cell interior 148 for delivering compressed air to the fuel cell assembly 144 for cooling the fuel cell 145.

In such environments, it is important to reduce any sort of contaminant from entering into the fuel cell interior 148. Fuel cells are known to be very sensitive to hydrocarbon poisoning. In view of this, the rotating machine 20 including the first seal assembly 34 having the first mating ring 40 and the first carbon ring 36, and optionally the second impeller wheel 32 and the second seal assembly 44 having the second mating ring 50 and the second carbon ring 46, reduces leakage of contaminants to the first impeller wheel 30, and when present the second impeller wheel 32, which overall increases performance and longevity of the rotating machine 20. In particular, the rotating machine 20 including the first seal assembly 34 and optionally the second seal assembly 44 greatly reduces, if not eliminates, hydrocarbons and other contaminants from entering the fuel cell interior 148. In embodiments where the rotating machine 20 includes the first and second lubricant-fed bearings 138, 140, the first and second seal assemblies 34, 44 allow the rotating machine 20 to utilize the cheaper, more efficient, and longer lasting lubricant-fed bearings as the first and second seal assemblies 34, 44, greatly reduce, if not eliminates, any contaminants such as hydrocarbons from entering the fuel cell interior 148.

Having the mating ring 40 and the carbon ring 36 prevent lubricant from the lubricant-fed bearing 138 and other contaminants from entering the compressor housing interior 152 and, therefore, from entering the fuel cell interior 148, overall increases performance and longevity of the rotating machine 20. Additionally, as described above, fuel cells are highly sensitive to any form of hydrocarbon contamination, and the mating ring 40 and the carbon ring 36 reduce, if not eliminate, hydrocarbon contaminants from the lubricant from entering into the fuel cell interior 148. Preventing hydrocarbon contaminants from the lubricant from entering into the fuel cell interior 148 increases efficiency and longevity of the fuel cell 145, as hydrocarbons and other contaminants are unable to poison the fuel cell 145 and reduce efficiency over time.

In some embodiments of the system 142, the carbon surface 38 has the carbon ring inner diameter CID1 and the carbon ring outer diameter COD1 spaced from carbon ring inner diameter CID1 radially away from the axis A, and the mating surface 42 has the land portion 70 configured to contact the carbon surface 38 the an inner mating diameter IMD1 radially aligned with the carbon ring inner diameter CID1 with respect to the axis A and the outer mating diameter OMD1 radially aligned with the carbon ring outer diameter COD1 with respect to the axis A. Further, in such embodiments, the land portion 70 has the land area 76 between the inner and outer mating diameters IMD1, OMD1, the mating surface 42 defines the plurality of grooved portions 78 disposed about the axis A, and the plurality of grooved portions 78 have the grooved area 80 between the inner and outer mating diameters IMD1, OMD1, with a ratio of the land area 76 to the grooved area is between 1.3 and 2.9.

It is to be appreciated that the system 142 includes embodiments where the rotating machine 20 has only one impeller wheel (e.g., first impeller wheel 30) and, therefore, only the first seal assembly 34, and where the rotating machine 20 has two impeller wheels (e.g., the first and second impeller wheels 30, 32). In such embodiments where the rotating machine 20 of the system 142 includes the first and second impeller wheels 30, 32, it is to be appreciated that the second impeller wheel 32 may be further defined as a compressor wheel configured to deliver compressed air or as a turbine wheel configured to receive a working fluid, such as exhaust gas. In either embodiment, it is to be appreciated that the rotating machine 20 of the system 142 may include the second seal assembly 44 including the second carbon ring 46 and second mating ring 50 as described in detail above.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A rotating machine comprising:
   a shaft extending along an axis between a first end and a second end spaced from said first end along said axis;
   a first impeller wheel coupled to said first end of said shaft;
   a second impeller wheel coupled to said second end of said shaft;
   a first seal assembly comprising,
      a first carbon ring disposed about said shaft and spaced from said first impeller wheel along said axis, with said first carbon ring having a first carbon surface, and
      a first mating ring disposed about said shaft and spaced from said first impeller wheel along said axis such that said first carbon ring is disposed between said first impeller wheel and said first mating ring, with said first mating ring having a first mating surface facing and configured to contact said first carbon surface;
   a second seal assembly comprising,
      a second carbon ring disposed about said shaft and spaced from said second impeller wheel along said axis, with said second carbon ring having a second carbon surface, and
      a second mating ring disposed about said shaft and spaced from said second impeller wheel along said axis such that said second carbon ring is disposed between said second impeller wheel and said second mating ring, with said second mating ring having a second mating surface facing and configured to contact said second carbon surface;
   an electric machine, with said electric machine comprising a rotor rotatably coupled to said shaft, and a stator disposed about said rotor;
   a first lubricant-fed bearing rotatably supporting said shaft at said first end of said shaft; and
   a second lubricant-fed bearing rotatably supporting said shaft at said second end of said shaft.

2. The rotating machine as set forth in claim 1, wherein said first mating surface faces said first end of said shaft and said second mating surface faces said second end of said shaft such that said first and second mating surfaces are facing opposite directions with respect to said axis.

3. The rotating machine as set forth in claim 1, wherein said first and second impeller wheels are removably coupled to said shaft.

4. The rotating machine as set forth in claim 1, wherein said first and second impeller wheels are comprised of aluminum or titanium.

5. The rotating machine as set forth in claim 1, wherein said first impeller wheel is further defined as a compressor wheel configured to deliver compressed air, and wherein said second impeller wheel is further defined as a turbine wheel configured to receive a working fluid.

6. The rotating machine as set forth in claim 1, wherein said first impeller wheel is further defined as a first compressor wheel configured to deliver compressed air, wherein said second impeller wheel is further defined as a second compressor wheel configured to deliver compressed air, and wherein said electric machine is configured to transmit torque to said shaft to rotate said first and second compressor wheels.

7. The rotating machine as set forth in claim 6, further comprising a bearing housing defining a bearing housing interior, wherein said electric machine is disposed in said bearing housing interior.

8. The rotating machine as set forth in claim 7, further comprising a first compressor housing defining a first compressor interior and coupled to said bearing housing, and a second compressor housing defining a second compressor interior and coupled to said bearing housing and spaced from said first compressor housing along said axis such that said bearing housing is disposed between said first and second compressor housings with respect to said axis, wherein said first compressor wheel is disposed in said first compressor interior and said second compressor wheel is disposed in said second compressor interior.

9. The rotating machine as set forth in claim 1, wherein said first carbon surface has a first carbon ring inner diameter and a first carbon ring outer diameter spaced from said first carbon ring inner diameter radially away from said axis, wherein said first mating surface has a first land portion configured to contact said first carbon surface between a first inner mating diameter radially aligned with said first carbon ring inner diameter with respect to said axis and a first outer mating diameter radially aligned with said first carbon ring outer diameter with respect to said axis, wherein said first land portion has a first land area between said first inner and first outer mating diameters, wherein said first mating surface defines a first plurality of grooved portions disposed about said axis, wherein said first plurality of grooved portions have a first grooved area between said first inner and first outer mating diameters, and wherein a ratio of said first land area to said first grooved area is between 1.3 and 2.9.

10. The rotating machine as set forth in claim 9, wherein said first plurality of grooved portions has a first groove inner diameter, and wherein a ratio of said first carbon ring inner diameter to said first groove inner diameter is greater than 1.0.

11. The rotating machine as set forth in claim 10, wherein said ratio of said first carbon ring inner diameter to said first groove inner diameter is between 1.02 and 1.10.

12. The rotating machine as set forth in claim 9, wherein said first plurality of grooved portions have a first groove outer diameter, and wherein a ratio of said first carbon ring outer diameter to said first groove outer diameter is greater than 1.0.

13. The rotating machine as set forth claim 12, wherein said ratio of said first carbon ring outer diameter to said first groove outer diameter is between 1.05 and 1.25.

14. The rotating machine as set forth in claim 9, wherein said second carbon surface has a second carbon ring inner diameter and a second carbon ring outer diameter spaced from said second carbon ring inner diameter radially away from said axis, wherein said second mating surface has a second land portion configured to contact said second carbon surface between a second inner mating diameter radially aligned with said second carbon ring inner diameter with respect to said axis and a second outer mating diameter radially aligned with said second carbon ring outer diameter with respect to said axis, wherein said second land portion has a second land area between said second inner and second outer mating diameters, wherein said second mating surface defines a second plurality of grooved portions disposed about said axis, wherein said second plurality of grooved portions have a second grooved area between said second inner and second outer mating diameters, and wherein a second ratio of said second land area to said second grooved area is between 1.3 and 2.9.

15. The rotating machine as set forth in claim 14, wherein said first plurality of grooved portions are spiraled about said axis, and wherein said second plurality of grooved portions are spiraled about said axis.

16. The rotating machine as set forth in claim 15, wherein said first plurality of grooved portions has a first groove inner diameter, wherein a ratio of said first carbon ring inner diameter to said first groove inner diameter is greater than 1.0, wherein said second plurality of grooved portions has a second groove inner diameter, and wherein a ratio of said second carbon ring inner diameter to said second groove inner diameter is greater than 1.0.

17. The rotating machine as set forth 18, wherein said ratio of said first carbon ring inner diameter to said first groove inner diameter is between 1.02 and 1.10, and wherein said ratio of said second carbon ring inner diameter to said second groove inner diameter is between 1.02 and 1.10.

18. The rotating machine as set forth in 14, wherein said first plurality of grooved portions has a first groove outer diameter, wherein a ratio of said first carbon ring outer diameter to said first groove outer diameter is greater than 1.0, wherein said second plurality of grooved portions has a second groove outer diameter, and wherein a ratio of said second carbon ring outer diameter to said second groove outer diameter is greater than 1.0.

19. The rotating machine as set forth in 18, wherein said ratio of said first carbon ring outer diameter to said first groove outer diameter is between 1.05 and 1.25, and wherein said ratio of said second carbon ring outer diameter to said second groove outer diameter is between 1.05 and 1.25.

20. The rotating machine as set forth in claim 1, wherein said first mating ring comprises a first cylindrical sleeve coupled to and rotatable with said shaft, and a first flange extending radially from said first cylindrical sleeve such that said first mating ring is configured as a flinger, with said first cylindrical sleeve extending from said first flange toward said first impeller wheel, and wherein said second mating ring comprises a second cylindrical sleeve coupled to and rotatable with said shaft, and a second flange extending radially from said second cylindrical sleeve such that said second mating ring is configured as a second flinger, with said second cylindrical sleeve extending from said second flange toward said second impeller wheel.

21. The rotating machine as set forth in claim 1, further comprising a bearing housing defining a bearing housing interior, wherein said first lubricant-fed bearing is disposed in said bearing housing interior, and wherein said second lubricant-fed bearing is disposed in said bearing housing interior.

22. The rotating machine as set forth in claim 1, wherein said first mating surface faces said first impeller wheel and wherein said first carbon surface faces away from said first impeller wheel, and wherein said second mating surface faces said second impeller wheel and wherein said second carbon surface faces away from said second impeller wheel.

23. The rotating machine as set forth in claim 1, wherein said first and second lubricant-fed bearings are disposed between said first and second seal assemblies with respect to said axis.

24. A rotating machine comprising:
a bearing housing defining a bearing housing interior;
a shaft extending along an axis between a first end and a second end spaced from said first end along said axis, with said shaft disposed in said bearing housing interior;
an impeller housing coupled to said bearing housing, with said impeller housing defining an impeller housing interior;
a first impeller wheel coupled to said shaft at said first end and disposed in said impeller housing interior;

a second impeller wheel coupled to said shaft at said second end;

a first seal assembly disposed in said bearing housing interior and comprising, a first carbon ring disposed about said shaft and spaced from said first impeller wheel along said axis, with said first carbon ring having a first carbon surface, and a first mating ring disposed about said shaft and spaced from said first impeller wheel along said axis such that said first carbon ring is disposed between said first impeller wheel and said first mating ring, with said first mating ring having a first mating surface facing and configured to contact said first carbon surface;

a second seal assembly comprising, a second carbon ring disposed about said shaft and spaced from said second impeller wheel along said axis, with said second carbon ring having a second carbon surface, and a second mating ring disposed about said shaft and spaced from said second impeller wheel along said axis such that said second carbon ring is disposed between said second impeller wheel and said second mating ring, with said second mating ring having a second mating surface facing and configured to contact said second carbon surface;

a first lubricant-fed bearing disposed in said bearing housing interior and rotatably supporting said shaft at said first end, with said first seal assembly disposed between said first lubricant-fed bearing and said first impeller wheel with respect to said axis;

a second lubricant-fed bearing rotatably supporting said shaft at said second end, with said second seal assembly disposed between said second lubricant-fed bearing and said second impeller wheel with respect to said axis; and an electric machine comprising a rotor rotatably coupled to said shaft, and a stator disposed about said rotor;

wherein said impeller housing interior is adapted to be fluidly coupled to a contaminant free environment, with said first carbon ring and said first mating ring preventing lubricant from entering the contaminant free environment.

25. The rotating machine as set forth in claim 24, wherein said first carbon surface has a first carbon ring inner diameter and a first carbon ring outer diameter spaced from said first carbon ring inner diameter radially away from said axis, wherein said first mating surface has a first land portion configured to contact said first carbon surface between a first inner mating diameter radially aligned with said first carbon ring inner diameter with respect to said axis and a first outer mating diameter radially aligned with said first carbon ring outer diameter with respect to said axis, wherein said first land portion has a first land area between said first inner and outer mating diameters, wherein said first mating surface defines a first plurality of grooved portions disposed about said axis, wherein said first plurality of grooved portions have a first grooved area between said first inner and outer mating diameters, and wherein a ratio of said first land area to said first grooved area is between 1.3 and 2.9.

26. A system comprising:

a rotating machine comprising, a bearing housing defining a bearing housing interior, a shaft extending along an axis between a first end and a second end spaced from said first end along said axis, with said shaft disposed in said bearing housing interior;

a compressor housing coupled to said bearing housing, with said compressor housing defining a compressor housing interior;

a first compressor wheel coupled to said shaft at said first end and disposed in said compressor housing interior;

a second compressor wheel coupled to said shaft at said second end;

a first seal assembly disposed in said bearing housing interior and comprising, a first carbon ring disposed about said shaft and spaced from said first compressor wheel along said axis, with said first carbon ring having a first carbon surface, and a first mating ring disposed about said shaft and spaced from said first compressor wheel along said axis such that said first carbon ring is disposed between said first compressor wheel and said first mating ring, with said first mating ring having a first mating surface facing and configured to contact said first carbon surface, a second seal assembly comprising, a second carbon ring disposed about said shaft and spaced from said second compressor wheel along said axis, with said second carbon ring having a second carbon surface, and a second mating ring disposed about said shaft and spaced from said second compressor wheel along said axis such that said second carbon ring is disposed between said second compressor wheel and said second mating ring, with said second mating ring having a second mating surface facing and configured to contact said second carbon surface, a first lubricant-fed bearing disposed in said bearing housing interior and rotatably supporting said shaft at said first end, with said first seal assembly disposed between said first lubricant-fed bearing and said first compressor wheel with respect to said axis, a second lubricant-fed bearing rotatably supporting said shaft at said second end, with said second seal assembly disposed between said second lubricant-fed bearing and said second compressor wheel with respect to said axis; and an electric machine comprising a rotor rotatably coupled to said shaft, and a stator disposed about said rotor, with said electric machine being configured to transmit torque to said shaft to rotate said first compressor wheel; and a fuel cell assembly comprising, a fuel cell housing defining a fuel cell interior, and a fuel cell disposed in said fuel cell interior;

wherein said compressor housing is coupled to said fuel cell housing, and wherein said compressor housing interior is fluidly coupled to said fuel cell interior for delivering compressed air to said fuel cell assembly for cooling said fuel cell.

27. The system as set forth in claim 26, wherein said first carbon surface has a first carbon ring inner diameter and a first carbon ring outer diameter spaced from said first carbon ring inner diameter radially away from said axis, wherein said first mating surface has a first land portion configured to contact said first carbon surface between a first inner mating diameter radially aligned with said first carbon ring inner diameter with respect to said axis and a first outer mating diameter radially aligned with said first carbon ring outer diameter with respect to said axis, wherein said first land portion has a first land area between said first inner and outer mating diameters, wherein said first mating surface defines a first plurality of grooved portions disposed about said axis, wherein said first plurality of grooved portions have a first grooved area between said first inner and outer mating diameters, and wherein a ratio of said first land area to said first grooved area is between 1.3 and 2.9.

* * * * *

UNITED STATES PATENT AND TRADEMARK OFFICE
CERTIFICATE OF CORRECTION

| | |
|---|---|
| PATENT NO. | : 11,384,772 B2 |
| APPLICATION NO. | : 16/788809 |
| DATED | : July 12, 2022 |
| INVENTOR(S) | : Garrard et al. |

It is certified that error appears in the above-identified patent and that said Letters Patent is hereby corrected as shown below:

On the Title Page

Item (63), Related U.S. Application Data, please delete "16/136,491" and replace with
-- 16/135,491 --

In the Claims

Column 20, Line 9, Claim 17, please delete "The rotating machine as set forth 18, wherein said" and replace with -- The rotating machine as set forth 16, wherein said --

Signed and Sealed this
Thirteenth Day of September, 2022

*Katherine Kelly Vidal*

Katherine Kelly Vidal
*Director of the United States Patent and Trademark Office*